United States Patent [19]
Tatamiya

[11] Patent Number: 6,081,674
[45] Date of Patent: Jun. 27, 2000

[54] CAMERA HAVING A DATA IMPRINTING DEVICE

[75] Inventor: Hisashi Tatamiya, Tokyo, Japan

[73] Assignee: Asahi Kogaku Kogyo Kabushiki Kaisha, Tokyo, Japan

[21] Appl. No.: 08/943,108

[22] Filed: Oct. 3, 1997

[30] Foreign Application Priority Data

| Oct. 8, 1996 | [JP] | Japan | 8-287680 |
| Jun. 10, 1997 | [JP] | Japan | 9-168032 |
| Jun. 10, 1997 | [JP] | Japan | 9-168033 |
| Jun. 26, 1997 | [JP] | Japan | 9-185892 |

[51] Int. Cl.$^7$ ................................................. G03B 17/24
[52] U.S. Cl. ........................................................ 396/318
[58] Field of Search ..................................... 396/315–318

[56] References Cited

U.S. PATENT DOCUMENTS

| 4,493,543 | 1/1985 | Lundberg et al. | 396/318 |
| 4,497,552 | 2/1985 | Howard et al. | 396/317 |
| 4,987,434 | 1/1991 | Soshi et al. | 396/318 |
| 5,003,329 | 3/1991 | Itabashi | 396/318 |
| 5,028,942 | 7/1991 | Kirigaya | 396/318 |
| 5,294,950 | 3/1994 | Duvall et al. | 396/318 |
| 5,471,266 | 11/1995 | Satou | 396/318 |
| 5,617,162 | 4/1997 | Kato et al. | 396/318 |
| 5,678,084 | 10/1997 | Hori | 396/317 |

FOREIGN PATENT DOCUMENTS

| 0028480 | 5/1981 | European Pat. Off. . |
| 1211567 | 11/1970 | United Kingdom . |
| 1246213 | 9/1971 | United Kingdom . |
| 8300747 | 3/1983 | WIPO . |

OTHER PUBLICATIONS

Copy of a United Kingdom Search Report issued on Nov. 7, 1997.

*Primary Examiner*—W. B. Perkey
*Attorney, Agent, or Firm*—Greenblum & Bernstein, P.L.C.

[57] ABSTRACT

A camera is disclosed which includes a camera body, a mirror box formed inside the camera body, a film holder receiving portion formed at the rear of the camera body behind the mirror box, and an aperture frame having a photographic aperture for forming the limits of each frame exposed, wherein the aperture frame is positioned between the mirror box and the film holder receiving portion. The camera also includes a film holder for accommodating a Brownie film roll, wherein the film holder is detachably attached to the film holder receiving portion. A pair of film guide rollers is also provided in the film holder that extends parallel to each other so as to be respectively positioned along and adjacent to opposite ends of the photographic aperture, wherein the film holder is attached to the film holder receiving portion so that a film drawn out of the film roll is wound around the pair of film guide rollers. In addition, a data imprinting device is provided that is supported by the camera body and that imprints photographic data on a portion of the film which is wound around one of the pair of film guide rollers.

53 Claims, 18 Drawing Sheets

CAMERA HAVING A DATA IMPRINTING DEVICE

BACKGROUND OF THE INVENTION

1. Field of the Invention

The present invention relates to a medium format camera using Brownie film that is provided with an interchangeable film holder. More specifically, the invention relates to a camera having a data imprinting device for imprinting data, such as a date, time, shutter speed, aperture value, etc. on each frame of the film at the time of exposure.

2. Description of the Related Art

Many recently-produced 35 mm cameras, which use 35 mm film, are provided with a data imprinting device for imprinting data (i.e., photographic data) such as a date, time, shutter speed, aperture value, etc. on each frame of the film (film frame) at the time of exposure.

In a 35 mm camera provided with such a data imprinting device, a tiny or small window or opening is generally formed on the pressure plate at a position opposed to either an upper or lower film guide rail formed on an aperture frame having a rectangular photographic aperture. In addition, and a character generator including LEDs is typically disposed behind the aforementioned tiny window.

This character generator emits light to be projected towards the film frame to be exposed in accordance with character information output from a CPU. The emitted light carries a certain image of a pattern of characters and is incident on the back of the film frame via an image forming optical system and the tiny window to thereby imprint the photographic data on the film frame as a latent image.

Although such a data imprinting device is widely used in 35 mm cameras, no medium format camera using Brownie film and having an interchangeable film holder is provided with such a data imprinting device due to the following reasons.

In imprinting an image of the emitted character pattern on the film frame by means of the aforementioned type of data imprinting device, it is important that the planarity of the film at a portion where the photographic data is to be imprinted should be positioned within the depth of focus of the image forming lens of the data imprinting device. Therefore, it is preferable that the photographic data be imprinted on either an upper or lower margin of that part of the film frame which is positioned between the upper and lower guide rails.

However, in a medium format camera using Brownie film that is provided with an interchangeable film holder, it is generally impractical for the photographic data to be imprinted on the film frame to be exposed from either the front or rear thereof. In the case where the photographic data is intended to be imprinted on the film frame to be exposed from the front thereof, i.e., on the photosensitive surface of the film frame, it is necessary for the data imprinting device to be disposed in front of the film frame. However, it is impossible to have such a disposition because a focal plane shutter is generally positioned immediately in front of the film frame. In the other case where the photographic data is intended to be imprinted on the film frame to be exposed from the rear thereof, i.e., from the side of the pressure plate, it is again very impractical to have such an arrangement because the film holder having the pressure plate is interchangeable with respect to the camera body, which makes it impossible to secure space for installation of the data imprinting device at a position opposed to either the upper or lower film guide rail.

The interchangeable film holder is generally provided with two parallel guide rollers, i.e., first and second guide rollers, arranged to be opposed to respective ends of the pressure plate in the film moving direction. The film is first wound around the first guide roller, subsequently wound around the second guide roller and finally wound around the film take-up spool.

Brownie film is a type of film roll consisting of a spool, film and paper with the film and paper being attached together and wound around the spool. Due to such a structure, there is a slight difference between the inner and outer circumferences of the attached paper and film. Therefore, there are tendencies that the film is taut while the paper is slack between the Brownie film roll (i.e., the spool of the Brownie film) and the first guide roller, and that the paper is taut while the film is slack between the second guide roller and the film take-up spool.

Due to such tendencies, it is technically possible for the photographic data to be clearly imprinted on the film at a portion thereof between the Brownie film roll and the first guide roller. However, it is impractical for the photographic data to be imprinted at that portion of the film because the imprinting process will come before the time of exposure for the corresponding film frame. It is also technically possible for the photographic data to be imprinted on the film at another portion thereof between the second guide roller and the take-up spool. In this case, however, it is difficult to imprint the photographic data clearly on the film because the position of the surface of the film at that portion changes between the second guide roller and the take-up spool due to the variation in the amount of slack of the film.

Accordingly, the aforementioned type of medium format camera equipped with a data imprinting device is strongly expected to be produced.

In addition, 35 mm cameras which can take pictures in either regular or panorama sized modes at each shot may be equipped with a data imprinting device for imprinting the photographic data on each frame within its range of exposure (i.e., within the range where subject images are to be exposed) at the time of exposure in either the regular or panorama sized modes. In this type of data imprinting device, the light having a certain image of a pattern of characters which is projected from the character generator of the data imprinting device is usually divided by a fixed prism or the like into two for regular and panorama photographies, respectively, and when the photographic data is to be imprinted on the film for one of the regular or panorama photography modes, one of the two divided lights which corresponds to the currently selected photographic size is allowed to be incident on the film while the other of the two divided lights which corresponds to the currently non-selected photographic size is intercepted so as to not reach the film.

Due to such a structure, in such a conventional type of regular/panorama size selectable type of camera equipped with the data imprinting device, the imprinting position relative to the film frame at which the photographic data is to be imprinted is fixed and thus cannot be changed for each shot. That is, for example, the photography data cannot be imprinted on a film frame within its range of exposure at one shot and also imprinted on another film frame out of its range of exposure at another shot.

In such a conventional type of regular/panorama size selectable type of camera equipped with the data imprinting device, it is also impossible to change the imprinting position depending upon the type of photographic data. That is, for example, it is impossible to imprint the date, time, etc. on the film frame within its range of exposure while imprinting a shutter speed and an aperture value on the same film frame out of its range of exposure.

Furthermore, in such a conventional type of regular/ panorama size selectable type of camera equipped with the data imprinting device, since the light projected from the character generator of the data imprinting device is divided into two by the fixed prism or the like as mentioned before, the quantity of each of the two divided lights is small, which makes it impossible to imprint the photographic data on the film frame sharply and clearly.

SUMMARY OF THE INVENTION

The present invention has been realized in view of the aforementioned drawbacks, and an object of the present invention is to provide a focal plane shutter type of medium format camera using Brownie film that is provided with an interchangeable film holder and equipped with a data imprinting device for imprinting photographic data on the film frame to be exposed.

Another object of the present invention is to provide a camera equipped with a data imprinting device for imprinting photographic data on the film frame to be exposed, wherein the photographic data can be imprinted at different positions on the film frame.

Yet another object of the present invention is to provide a camera which can take pictures in either regular or panorama sized mode at each shot and that is equipped with a data imprinting device for imprinting photographic data on the film frame, wherein the photographic data can be always clearly imprinted in each of the regular and panorama photography modes.

Yet another object of the present invention is to provide a focal plane shutter type of medium format camera using Brownie film that is provided with an interchangeable film holder and equipped with a data imprinting device for imprinting photographic data on the film frame to be exposed, wherein the photographic data can be imprinted at different positions on the film frame and further wherein the photographic data can be clearly imprinted in each of the regular and panorama photography modes.

Other objects of the present invention will be apparent from the following detailed description of preferred embodiments of the invention and from the appended claims and drawings.

According to an aspect of the present invention, there is provided a camera which includes: a camera body; a mirror box formed inside the camera body; a film holder receiving portion formed at the rear of the camera body behind the mirror box; an aperture member having a photographic aperture for forming the limits of each exposed frame, the aperture member being positioned between the mirror box and the film holder receiving portion; a film holder for accommodating a film roll, the film holder being detachably attached to the film holder receiving portion; a pair of film guide rollers provided in the film holder and extending parallel to each other to be respectively positioned along and adjacent to opposite ends of the photographic aperture, with the film holder being attached to the film holder receiving portion so that a film drawn out of the film roll is wound around the pair of film guide rollers; and a data imprinting device, supported by the camera body, for imprinting photographic data on a portion of the film which is wound around one of the pair of film guide rollers.

Preferably, the data imprinting device is formed as a unit to be supported by the camera body at a position adjacent to the film holder receiving portion.

Preferably, the film holder includes a take-up spool positioned in the film holder to be parallel to a spool of the film roll, wherein the one of the pair of film guide rollers, around which the imprinting portion of the film is wound, is positioned in front of the take-up spool.

Preferably, the aperture member includes film guide rails extending perpendicular to the pair of film guide rollers on respective sides of the photographic aperture to guide the film from one of the pair of film guide rollers to the other of the pair of film guide rollers, the data imprinting device including a slit through which light carrying an image of character pattern is projected to the film. he slit may be positioned to face an outer periphery of one of the pair of film guide roller in the vicinity of an end of one of the film guide rails.

Preferably, the data imprinting device is formed as a unit and includes: a housing supported by the camera body to face the imprinting portion of the film with the film holder being attached to the film holder receiving portion; a character generator, supported by the housing, for emitting light carrying an image of a character pattern in accordance with character information; and an image forming optical system, positioned in the housing, for forming the image of the character pattern on the imprinting portion of the film.

Preferably, the housing is fixed to the camera body and includes a film guide surface for guiding the film between the film guide surface and an adjacent one of the pair of film guide rollers. The film holder may be attached to the film holder receiving portion to prevent the film, wound around the adjacent one of the pair of film guide rollers, from becoming loose.

Preferably, the film guide surface is formed as a smooth surface.

Preferably, the housing includes a slit through which light emitted by the character generator is projected to the film, wherein the slit id positioned to face the imprinting portion of the film with the film holder being attached to the film holder receiving portion.

Preferably, the camera includes a focal plane shutter for opening and closing the photographic aperture.

Preferably, the imprinting portion of the film is a marginal portion of the film which extends in a lengthwise direction of the film along an edge thereof.

Preferably, the pair of film guide rollers are positioned to extend in a widthwise direction of the film.

Preferably, the data imprinting device includes a light projecting portion for projecting light towards the film, wherein the light projecting portion is positioned to face one of two marginal portions of the film in a widthwise direction of the film.

Preferably, the camera is a medium format camera, wherein the film is a Brownie film.

Preferably, the camera body is provided at a front thereof with a lens mount to which an interchangeable photographic lens is detachably attached.

According to another aspect of the present invention, there is provided a camera which includes: a camera body; a film holder for accommodating a film roll, the film holder being detachably attached to the camera body; a take-up spool positioned in the film holder; a film guide roller positioned in the film holder in front of the take-up spool for guiding a film drawn out of the film roll to the take-up spool; and a data imprinting unit for imprinting photographic data on a portion of the film which is wound around the film guide roller.

Preferably, the data imprinting device is formed as a unit which is movably supported by the camera body in a direction towards and away from the imprinting portion of the film.

Yet another aspect of the present invention, there is provided a camera which includes: a camera body; a film holder for accommodating a film roll, the film holder being detachably attached to the camera body; a take-up spool positioned in the film holder; a film guide roller positioned in the film holder in front of the take-up spool for guiding a film drawn out of the film roll to the take-up spool; a data imprinting unit for imprinting photographic data on a portion of the film which is wound around the film guide roller with the film holder being attached to the camera body, the data imprinting unit being movable in a direction towards and away from the imprinting portion of the film; and a biasing member for biasing the data imprinting unit towards the imprinting portion of the film.

Preferably, the data imprinting device is formed as a unit which is movably supported by the camera body in a widthwise direction of the film. In addition, the camera may further include a device for moving the data imprinting unit in the widthwise direction of the film.

Preferably, the data imprinting unit is movable in the widthwise direction of the film between a first position, where the data imprinting unit can imprint the photographic data on a marginal portion of the film which is out of an image plane on the film and a second position where the data imprinting unit can imprint the photographic data within the image plane on the film.

Preferably, the data imprinting unit imprints photographic data including at least a shutter speed and an aperture value when positioned at the first position or imprints photographic data including at least time or date of photography when positioned at the second position.

Yet according to another aspect of the present invention, there is provided a camera which includes: a camera body; a film holder for accommodating a film roll, the film holder being detachably attached to the camera body; a take-up spool positioned in the film holder; a film guide roller positioned in the film holder in front of the take-up spool for guiding a film drawn out of the film roll to the take-up spool; and a data imprinting unit for imprinting photographic data on a portion of the film which is wound around the film guide roller with the film holder being attached to the camera body, the data imprinting unit being movable in a widthwise direction of the film.

Yet according to another aspect of the present invention, there is provided a camera which includes: a data imprinting unit for imprinting photographic data on a film, the data imprinting unit being shiftable in a widthwise direction of the film so that the photographic data can be imprinted on different positions on the film; and a device for shifting the data imprinting unit in the widthwise direction of the film.

Yet according to another aspect of the present invention, there is provided a camera which includes: a camera body; a grip formed on the camera body; and a film holder for accommodating a film roll, the film holder being detachably attached to the camera body; a data imprinting device for imprinting photographic data on a portion of a film drawn out of the film roll with the film holder being attached to the camera body, the data imprinting device being positioned to extend from the grip to the camera body.

Yet according to another aspect of the present invention, there is provided a camera which includes: a camera body; a film holder receiving portion formed at the rear of the camera body; a grip formed on one of right and left sides of the camera body; a film holder for accommodating a film roll, the film holder being detachably attached to the film holder receiving portion; a take-up spool positioned in the film holder to extend parallel to a spool of the film roll; upper and lower guide rollers disposed in the film holder in front of the take-up spool and the spool, respectively, and extending parallel to each other to be positioned on upper and lower sides of an image plane, respectively, with the film holder being attached to the film holder receiving portion so that a film drawn out of the film roll is wound around the upper and lower guide rollers; and a data imprinting device for imprinting photographic data on a portion of the film which is wound around the upper guide roller, the data imprinting device being arranged to lie in a right and left direction of the camera from the grip to the camera body.

The present disclosure relates to subject matter contained in Japanese Patent Applications Nos. 8-287680 (filed on Oct. 8, 1996), 9-168032 (filed on Jun. 10, 1997), 9-168033 (filed on Jun. 10, 1997) and 9-185892 (filed on Jun. 26, 1997), which are expressly incorporated herein by reference in their entireties.

BRIEF DESCRIPTION OF THE DRAWINGS

The invention will be described below in detail with reference to the accompanying drawings, in which similar members are indicated by similar reference numerals, and wherein.

DESCRIPTION OF THE PREFERRED EMBODIMENTS

Figure 1:
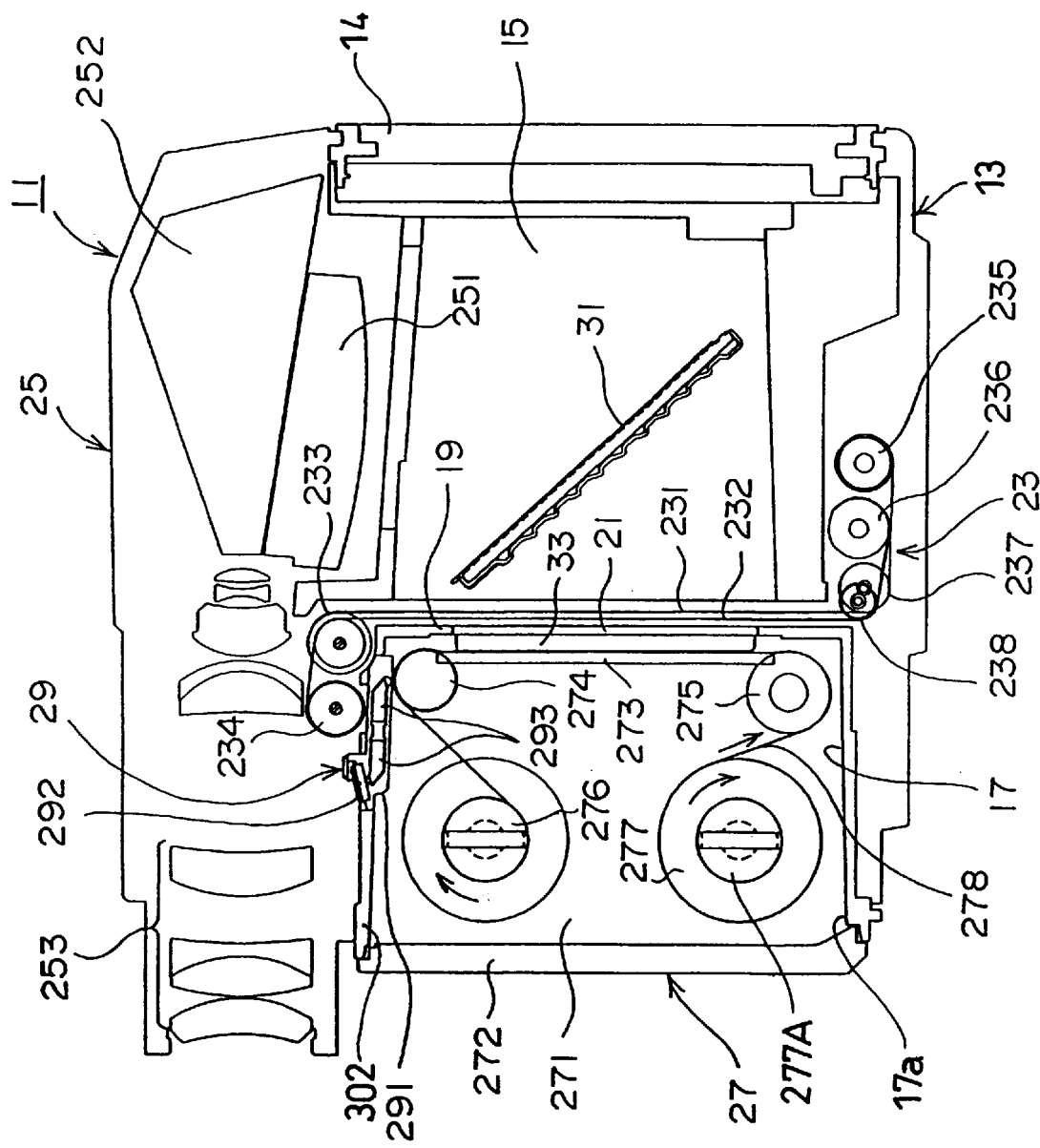
FIG. 1 is a cross-sectional view of a first embodiment of a camera using Brownie film that is provided with an interchangeable film holder.

FIGS. 1 through 4 show the first embodiment of a medium format SLR camera using Brownie film that is provided at its back with an interchangeable film holder 27. This camera 11 has a substantially box-shaped camera body 13 and is provided with a lens mount 14 fixed at the front end of the camera body 13 and a mirror box 15 positioned inside the camera body 13 at a front part thereof behind the lens mount 14. An interchangeable photographic lens (not shown) can be detachably attached to the lens mount 14.

The camera 11 is further provided with a film holder receiving chamber 17 formed at the rear of the camera body 13 and an aperture frame 19 positioned between the mirror box 15 and the film holder receiving chamber 17. The aperture frame 19 is provided at the center thereof with a rectangular photographic aperture 21 for forming the limits of each frame exposed.

The camera 11 is further provided with a focal plane shutter 23 for opening and closing the photographic aperture 21, a viewfinder 25 disposed in an upper portion of the camera body 13 above the mirror box 15, the aforementioned film holder 27 detachably attached to the camera body 13 by inserting the major part of the film holder 27 into the film holder receiving chamber 17, and a data imprinting unit 29 (i.e., data imprinting device) positioned in the vicinity of an upper portion of the film holder receiving chamber 17.

Inside the mirror box 15 is disposed a quick-return mirror 31, which usually intercepts a photographic light path between the photographic lens and the photographic aperture 21 and is moved up so as not to intercept the photographic light path at the time of exposure.

The above mentioned focal plane shutter 23 is provided with a leading curtain 231 and a trailing curtain 232 which substantially lie in the vertical direction of the camera 11 to cover the photographic aperture 21. Respective ends of the leading curtain 231 and the trailing curtain 232 at one side are wound around a leading curtain drum 233 and a trailing curtain drum 234, respectively, which are positioned inside the camera body 13 adjacent to each other above the photographic aperture 21, while the other ends of the front and rear curtain 231 and 232 at the other side are wound around a leading curtain spring drum 235 and a trailing curtain spring drum 236, respectively, which are positioned inside the camera body 13 adjacent to each other below the photographic aperture 21. The reference numerals 237 and 238 designate a guide roller for the leading curtain 231 and a guide roller for the trailing leading curtain 232, respectively.

The viewfinder 25 includes a condenser lens 251, a prism 252 and an eyepiece optical system 253. The condenser lens 251 is positioned above the mirror box 15 to receive light of subject images which passes through the photographic optical system to be reflected by the quick-return mirror 31 towards the condenser lens 251. The prism 252 serves as an erecting optical member for erecting inverted images. The eyepiece optical system 253 magnifies the erect images that exit the prism 252.

Figure 3:
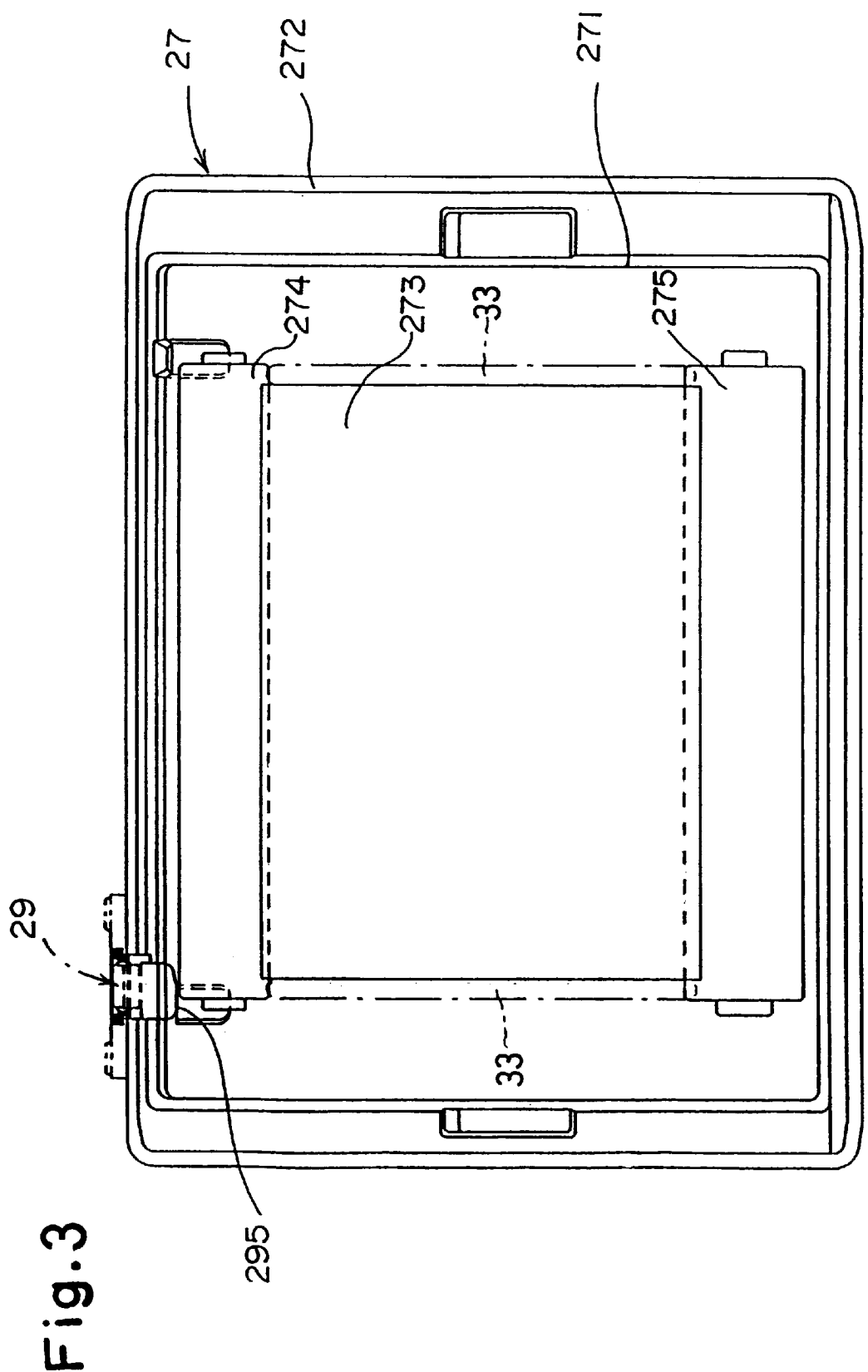
FIG. 3 is a plane view of the interchangeable film holder shown in FIG. 1.

As shown in FIGS. 1 and 3, the film holder 27 is provided with a film holder body 271 which is inserted in the film holder receiving chamber 17 from a rear end opening 17a thereof. The film holder body 271 is provided at its back with a back cover member 272 for covering the rear end opening 17a when the film holder body 271 is properly attached to the camera body 13. The film holder body 271 is further provided at its front with a pressure plate 273.

Inside the film holder body 271 an upper guide roller 274 and a lower guide roller 275 are horizontally and rotatably supported, with the upper and lower guide rollers 274 and 275 being adjacent to upper and lower ends of the pressure plate 273, respectively. Furthermore, inside the film holder body 271, a take-up spool 276 is rotatably supported parallel to and behind the upper guide roller 274. A Brownie film roll 277 of 120 type is loaded behind the lower guide roller 275 such that a spool 277A of the Brownie film roll 277 is rotatably supported by the film holder 27 to be parallel to the take-up spool 276. In place of the 120 type of Brownie film roll, a 220 type of Brownie film roll or the like may be loaded in the film holder body 271 in a similar manner.

The film 278 that has been drawn out of the film roll 277 is first wound around the lower guide roller 275, subsequently passed across the front face of the pressure plate 273, then wound around the upper guide roller 274 and finally wound by the take-up spool 276.

The aperture frame 19 is provided on its rear surface thereof with two parallel film guide rails 33 positioned on right and left sides of the photographic aperture 21, respectively. The two film guide rails 33 are opposed to the front surface of the pressure plate 273 at right and left ends thereof, respectively, with the film holder 27 being attached to the camera body 13.

The winding and rewinding operations of the film 278 may be performed by a known driving device (not shown) provided in the camera body 13. The driving device is linked with the take-up spool 276 and the spool 277A of the Brownie film roll 277 via a rotation transmission mechanism (not shown) provided in the film holder 27, so as to rotate the take-up spool 276 or the spool 277A of the Brownie film roll 277 in a direction to wind or rewind the film 278.

Figure 2:
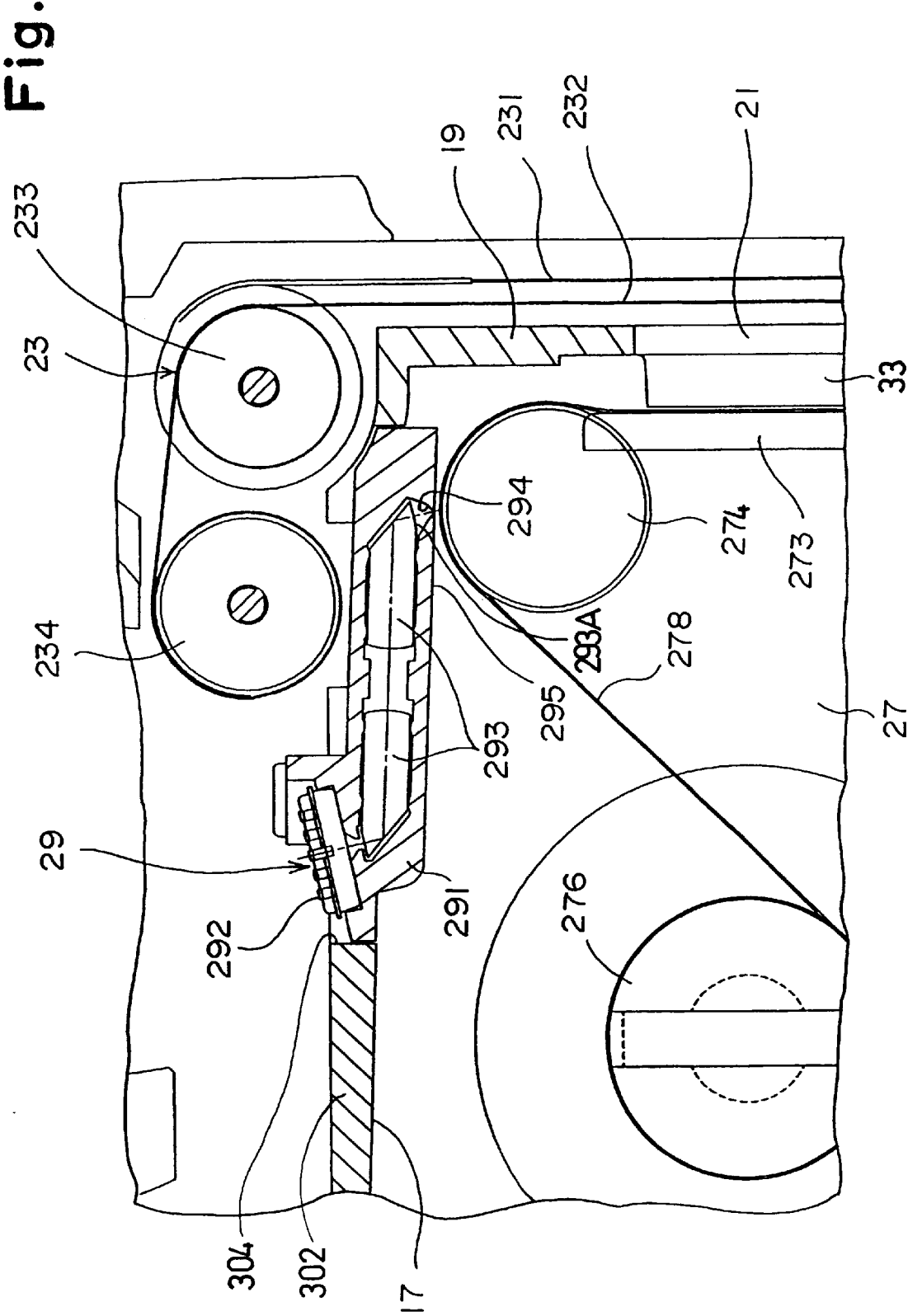
FIG. 2 is a cross-sectional view of a data imprinting unit and peripheral members of the camera shown in FIG. 1.

The data imprinting unit 29 consists of a housing 291, a character generator 292 and an image forming optical system 293 consisting of two separate optical elements as clearly shown in FIG. 2. The camera body 13 is provided below the eyepiece optical system 253 with an upper wall 302 which is formed integral with the camera body 13 to define the upper limit of the film holder receiving chamber 17. The upper wall 302 is provided at a front portion thereof with an elongated hole 304 (see FIG. 2) formed at a position opposed to a marginal portion 278A (see FIG. 4) of the film 278 wound around the upper guide roller 274, namely, at a position opposed to a periphery of the upper guide roller 274 in the vicinity of one end (left end as viewed in FIG. 3) thereof. As clearly shown in FIG. 2, the housing 291 is fixed to the upper wall 302 along the elongated hole 304 to substantially extend in the front and rear direction of the film holder receiving chamber 17, i.e., the front and rear direction of the camera 11, i.e., the right and left direction as viewed in FIG. 1 or 2. The character generator 292 is fixed to the housing 291 in a rear end space thereof and is provided with an LED light emitter (not shown) having multiple-dots (e.g. 7 dots) arranged in the vertical direction of characters to emit light in accordance with character information. The image forming optical system 293 is disposed in the housing 291 to extend from the character generator 292 to the front end of the housing 291 so that the light emitted by the character generator 292 is incident on the film 278 at a portion thereof which is wound around the upper guide roller 274 to form the image of a character pattern on that portion. A slit (i.e., light projecting portion) 294 is formed on the housing 291 at a bottom portion thereof that is opposed to a light emitting portion 293A of the image forming optical system 293, so that the light emitted from the light emitting portion 293A proceeds to the film 278 through the slit 294.

The slit 294 is opposed to the outer periphery of one end (left end as viewed in FIG. 3) of the upper guide roller 274 so that the slit 294 faces a corresponding marginal portion 278A (see FIG. 4) of the film 278 which is wound around the upper guide roller 274. A bottom surface of the housing 291 which is adjacent to the aforementioned outer periphery of the one end of the upper guide roller 274 is formed smooth serving as a film guide surface 295 for guiding the film 278 between this film guide surface 295 and the upper guide roller 274 to prevent the film 278 wound around the upper guide roller 274 from becoming loose or slack.

The camera 11 is provided with a conventional AF system (not shown) for driving the AF lens group provided in the interchangeable photographic lens to shift in the optical axis direction to bring subject images into focus in accordance with subject distance information when the release button (not shown) of the camera 11 is half depressed. Accordingly, with the camera 11, when the release button is half depressed with the camera being oriented towards a subject and with an unexposed film frame having been set, a focusing ring which is linked with the AF lens group in the photographic optical system is driven to rotate by an AF motor (not shown) in accordance with subject distance information to bring the subject into focus.

Thereafter, when the release button is fully depressed, an optimum aperture value and a shutter speed which have been selected in accordance with a detected subject brightness are set, the quick-return mirror 31 is moved up, and the front and rear curtains 231 and 232 of the focal plane shutter 23 operate in turn so that the film frame of the film 278 that faces the photographic aperture 21 is exposed.

At the moment the focal plane shutter 23 is fully closed after the exposure, the quick-return mirror 31 returns to its original position and at the same time a diaphragm (not shown) is opened. After the focal plane shutter 23 is fully closed, i.e., after the exposure of the film frame, the film 278 is wound up by one frame by the aforementioned driving device provided in the camera body 13.

Figure 4:
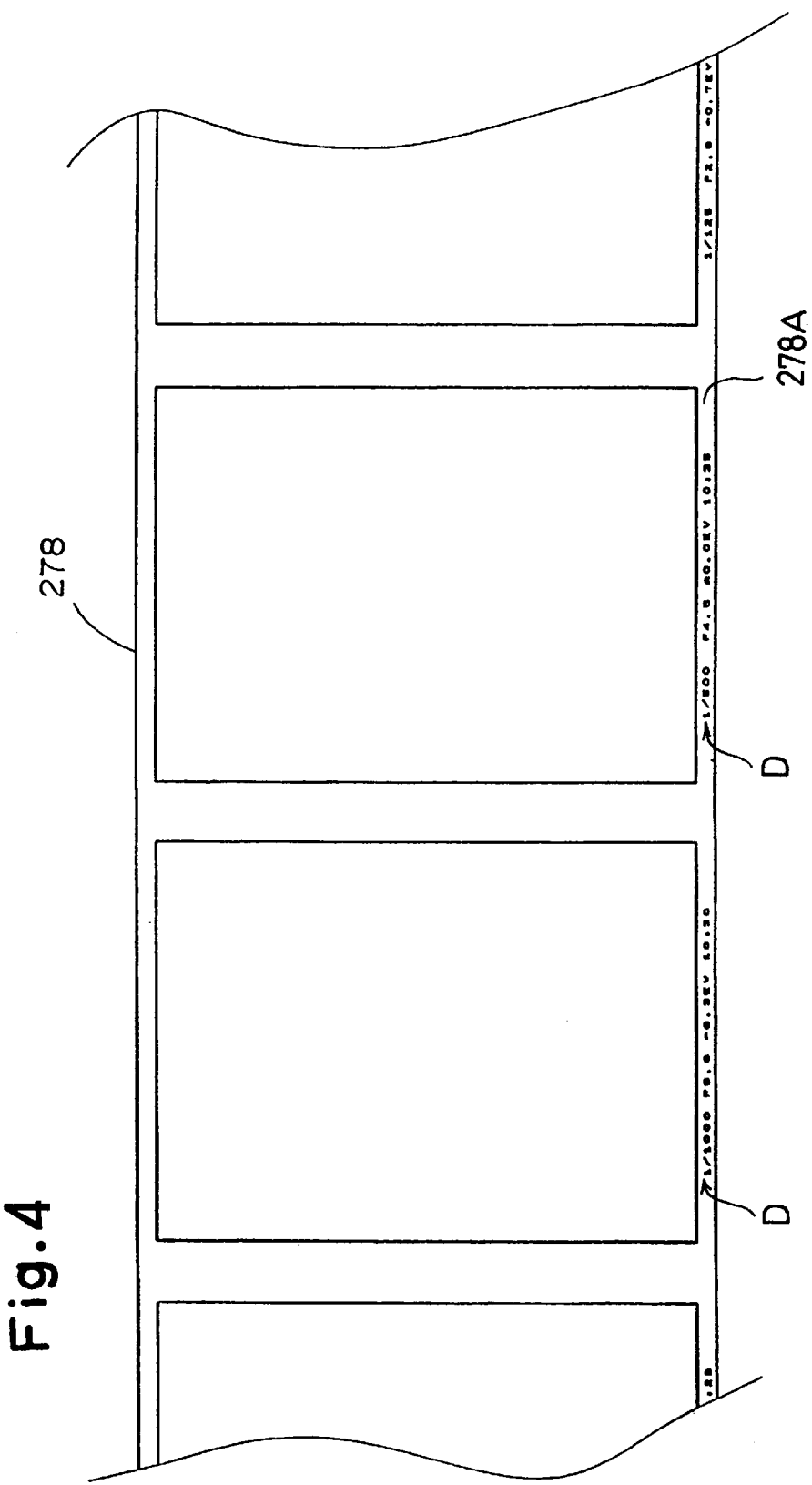
FIG. 4 is a plane view of a part of Brownie film, used in the camera shown in FIG. 1, on which photographic data has been imprinted.

While the film 278 is being wound up after the exposure of the film frame, photographic data for the film frame is successively output from a CPU (not shown) for controlling the data imprinting unit. This data is provided as input to the character generator 292 in synchronization with the film feeding speed, and the character generator 292 emits light in accordance with the input photographic data, so that the image of a certain character pattern is exposed on the unexposed marginal portion 278A of the exposed film frame. Namely, the photographic data is imprinted as a latent image on the unexposed marginal portion 278A of the exposed film frame, as shown in FIG. 4. FIG. 4 shows an example of the exposed film 278 on which photographic data D including the shutter speed, aperture value, exposure value, and date has been exposed on the marginal portion 278A of each exposed frame.

According to the first embodiment of the camera 11, due to the aforementioned arrangement of the camera 11 in which the camera body 13 is provided along the upper wall 302 of the film holder receiving chamber 17 with the data imprinting unit 29 and in which the image forming optical system 293 is arranged such that the light emitted by the character generator 292 is incident on the film 278 at a portion thereof which is wound around the upper guide roller 274 to form the image of a character pattern on that portion, the photographic data such as the date, time, shutter speed, aperture value, etc. can be clearly imprinted on the film 278 in the focal plane shutter type of medium format camera 11, that uses the interchangeable film holder 27, without making any modifications in the given film holder 27 and without being subject to the positions of the pressure plate 273 and the focal plane shutter 23.

Furthermore, since a bottom surface of the housing 291, which is positioned adjacent to the upper guide roller 274 in the film holder receiving chamber 17, is formed as the film guide surface 295 for guiding the film 278 between the film guide surface 295 and the upper guide roller 274, a part of the film 278 which is wound around the upper guide roller 274 is maintained so as not to become loose or slack on and around the upper guide roller 274. In addition so that the part of the film on and around the upper guide roller 274 can be maintained within the depth of focus of the image forming optical system 293 so that the photographic data is clearly imprinted on the film 278.

In the first embodiment of the camera 11, although the photographic data is imprinted by the data imprinting unit 29 on the marginal portion 278A of the film 278 that is out of the image plane of each frame, the photographic data may be imprinted by the data imprinting unit 29 within the image plane of each frame, e.g., along a margin of the image plane of each frame.

Furthermore, in the first embodiment of the camera 11, although the data imprinting device of the camera 11 is provided in the form of a unit, i.e., the data imprinting unit 29 having the character generator 292 and the image forming optical system 293 accommodated in the housing 291, the data imprinting device may not be provided in the form of a unit. That is, the character generator 292 and the image forming optical system 293 may be fixed directly to appropriate respective portions of the camera body 13 without the use of the housing 291.

FIGS. 5 through 8 show a second embodiment of a medium format SLR camera using Brownie film that is provided at its back with an interchangeable film holder 27. Since the second embodiment of the camera 11A is similar to the first embodiment of the camera 11, only those structures different from the first embodiment will be hereinafter discussed.

The main difference between the first and second embodiments is that in the first embodiment the data imprinting unit 29 is fixed to the upper wall 302 whereas in the second embodiment a data imprinting unit 29A, which is similar to the data imprinting unit 29 of the first embodiment, is rotatably supported by the upper wall 302 relative to the upper guide roller 274.

Figure 7:
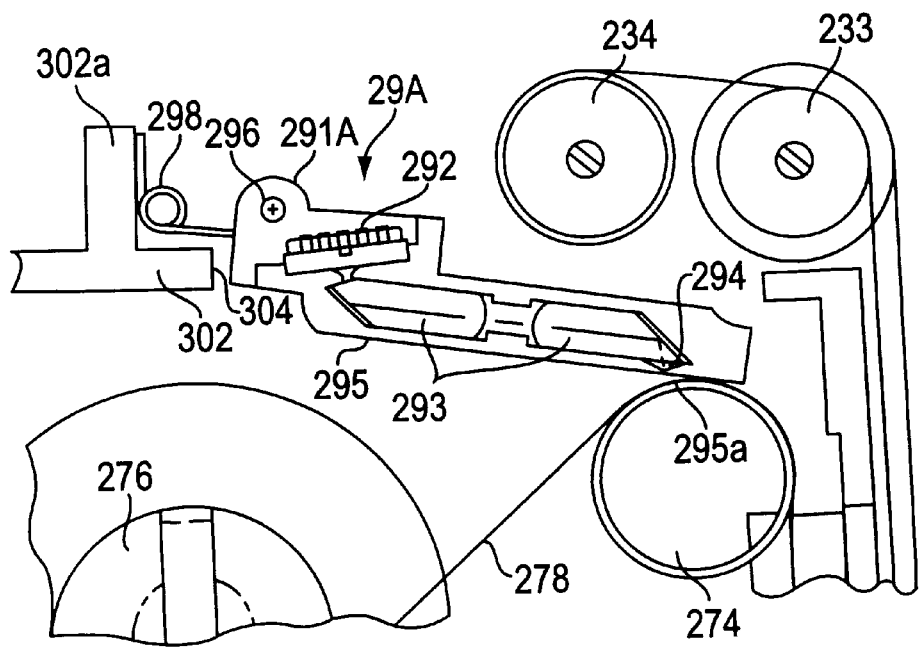
FIG. 7 is a cross-sectional view of the data imprinting unit and peripheral members of the camera shown in FIG. 5.
Figure 8:
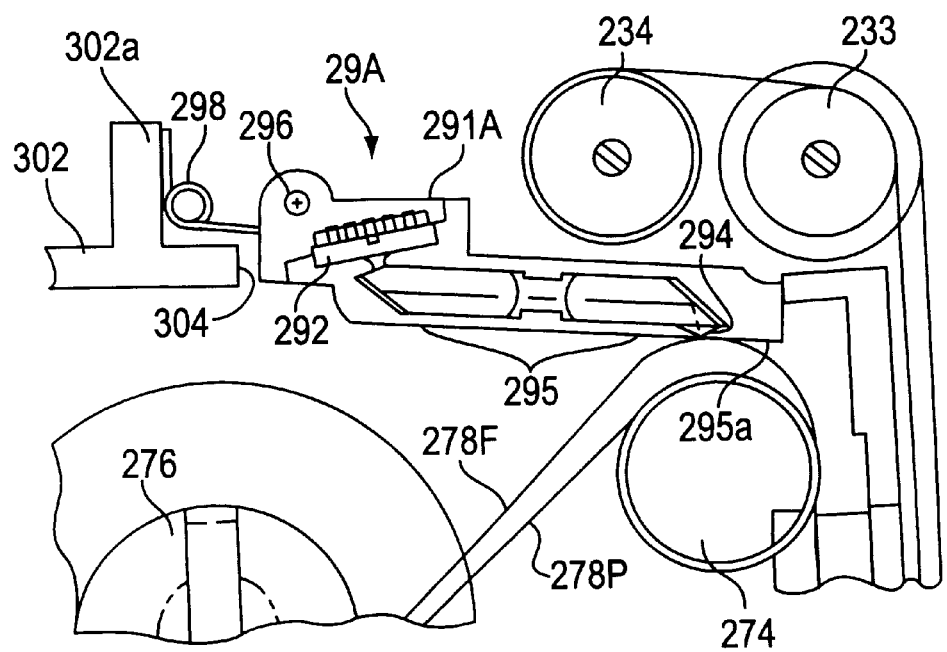
FIG. 8 is a cross-sectional view of the data imprinting unit and peripheral members of the camera shown in FIG. 7 in a state different from that shown in FIG. 7.
Figure 9:
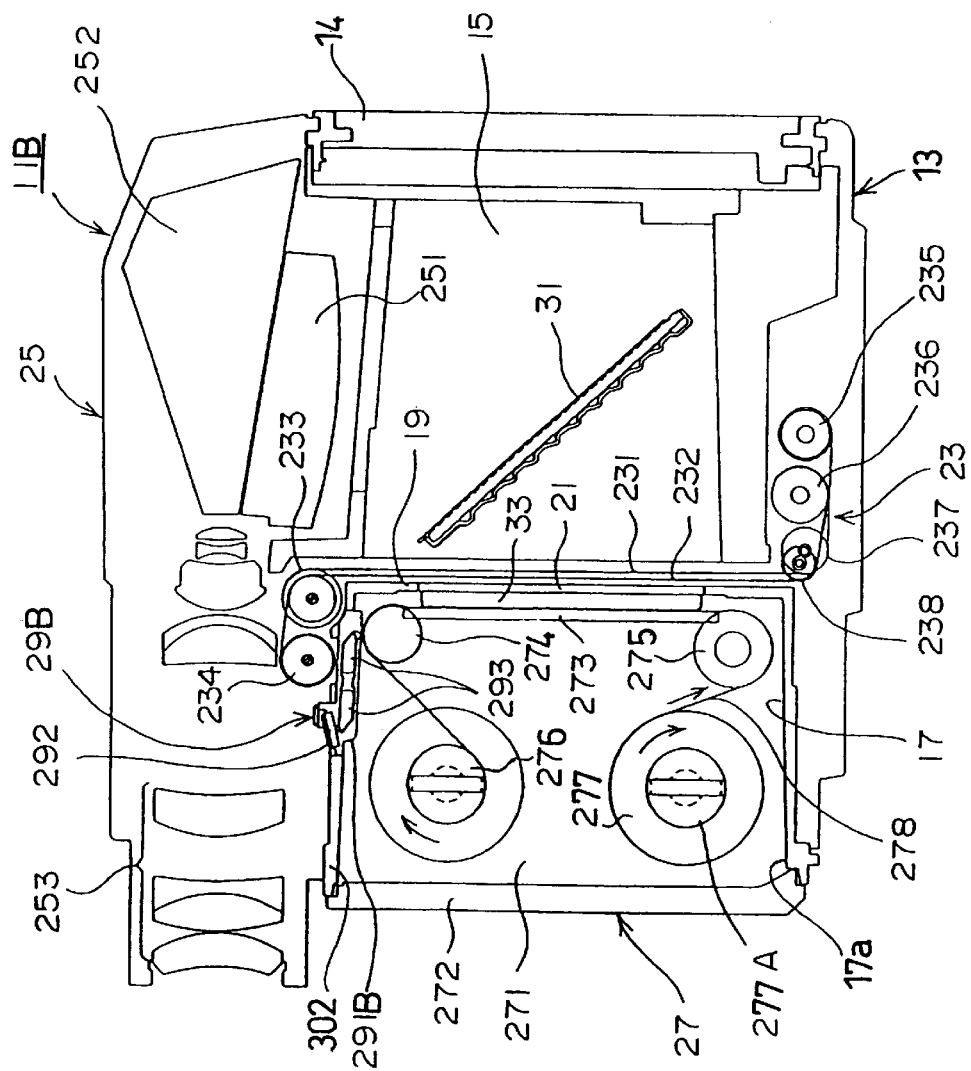
FIG. 9 is a cross-sectional view of a third embodiment of a camera using Brownie film that is provided with an interchangeable film holder.
Figure 10:
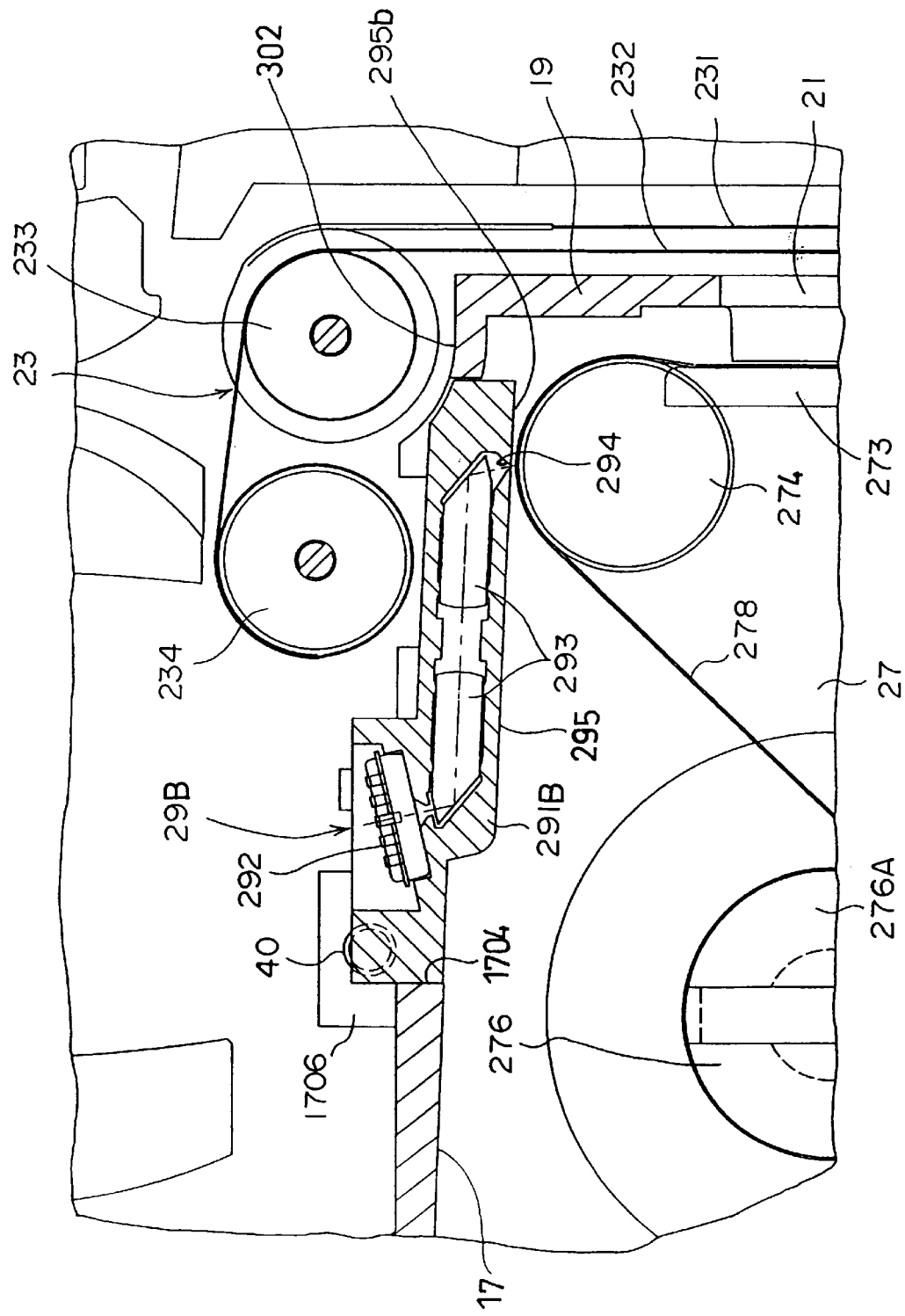
FIG. 10 is a cross-sectional view of a data imprinting unit and peripheral members of the camera shown in FIG. 9.

The data imprinting unit 29A consists of a housing 291A, a character generator 292 and an image forming optical system 293. A bottom surface of the housing 291A is formed as a film guide surface 295 similar to that of the housing 291 of the first embodiment. As shown in FIG. 7 or 8, the housing 291A is positioned along the elongated hole 304. The housing 291A is provided at a rear portion thereof with a shaft 296 which extends horizontally parallel to the upper guide roller 274. Both ends of the shaft 296 are rotatably fitted in respective supporting holes (not shown) formed on the upper wall 302 so that the housing 291A is rotatably supported by the upper wall 302 about the shaft 296. Therefore, the film guide surface 295 can move close to or apart from the upper guide roller 274, so that a bottom front surface 295a of the film guide surface 295 can contact the film 278 wound around the upper guide roller 274.

The character generator 292 is fixed to the housing 291A in a rear end space thereof. The image forming optical system 293 is disposed in the housing 291A to extend from the character generator 292 to the front end of the housing 291A so that the light emitted by the character generator 292 is incident on the film 278 at a portion thereof which is wound around the upper guide roller 274 to form the image of a character pattern on that portion. A slit 294 is formed on the housing 291A at a bottom thereof in a manner similar to the slit 294 formed on the housing 291 of the first embodiment. The slit 294 is formed on the bottom front surface 295a.

Figure 5:
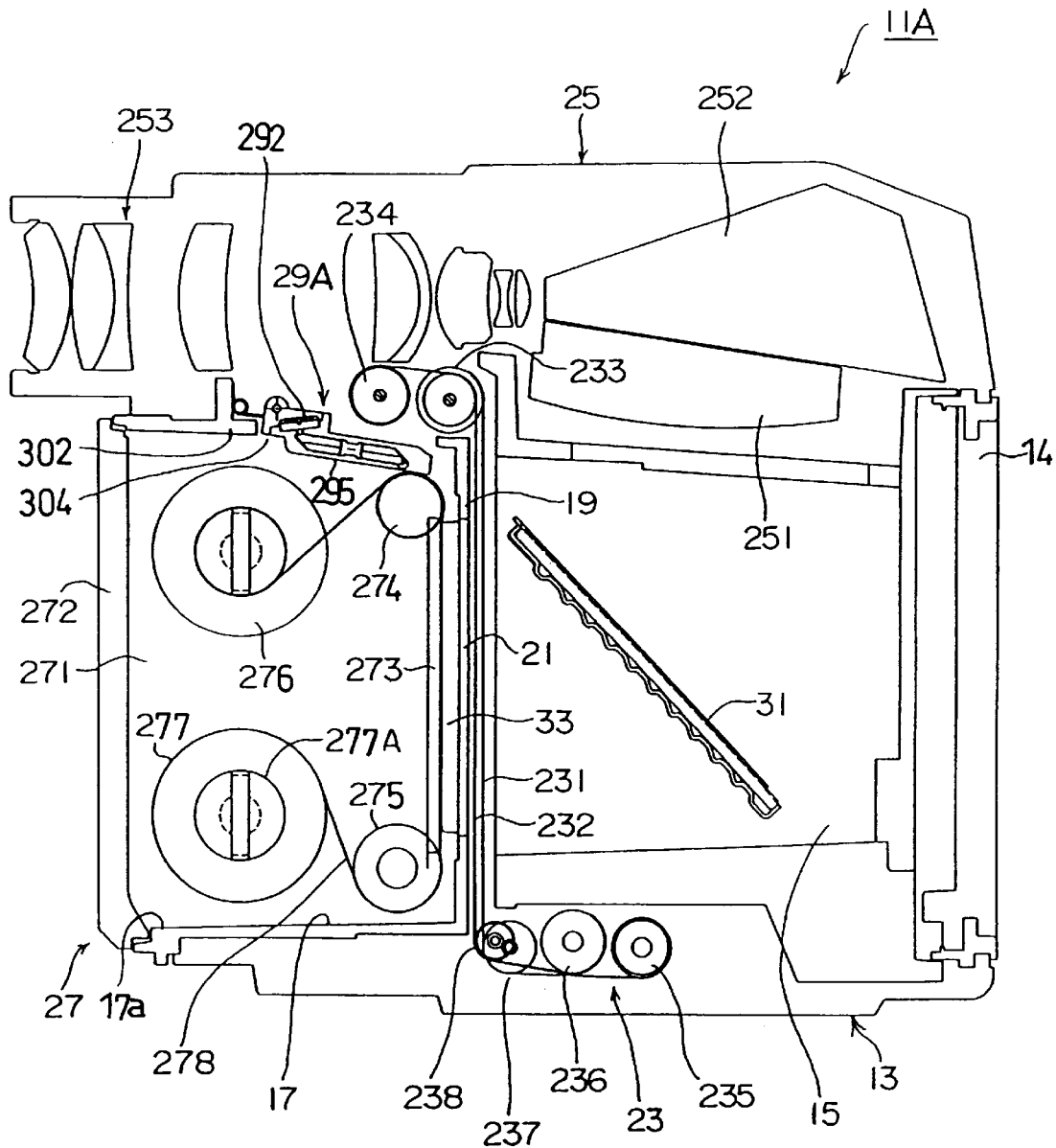
FIG. 5 is a cross-sectional view of a second embodiment of a camera using Brownie film that is provided with an interchangeable film holder.

The housing 291A is continuously biased to rotate in a direction to bring the bottom front surface 295a into contact with the film 278 wound around the upper guide roller 274, i.e., in a clockwise direction as viewed in FIG. 5, 7 or 8, by a torsion spring 298 which is supported by the upper wall 302 in the vicinity of the rear end of the housing 291A. One end of the torsion spring 298 is engaged with a projection 302a formed on an upper surface of the upper wall 302 while the other end of the torsion spring 298 is fixed to the rear end of the housing 291A.

Figure 6:
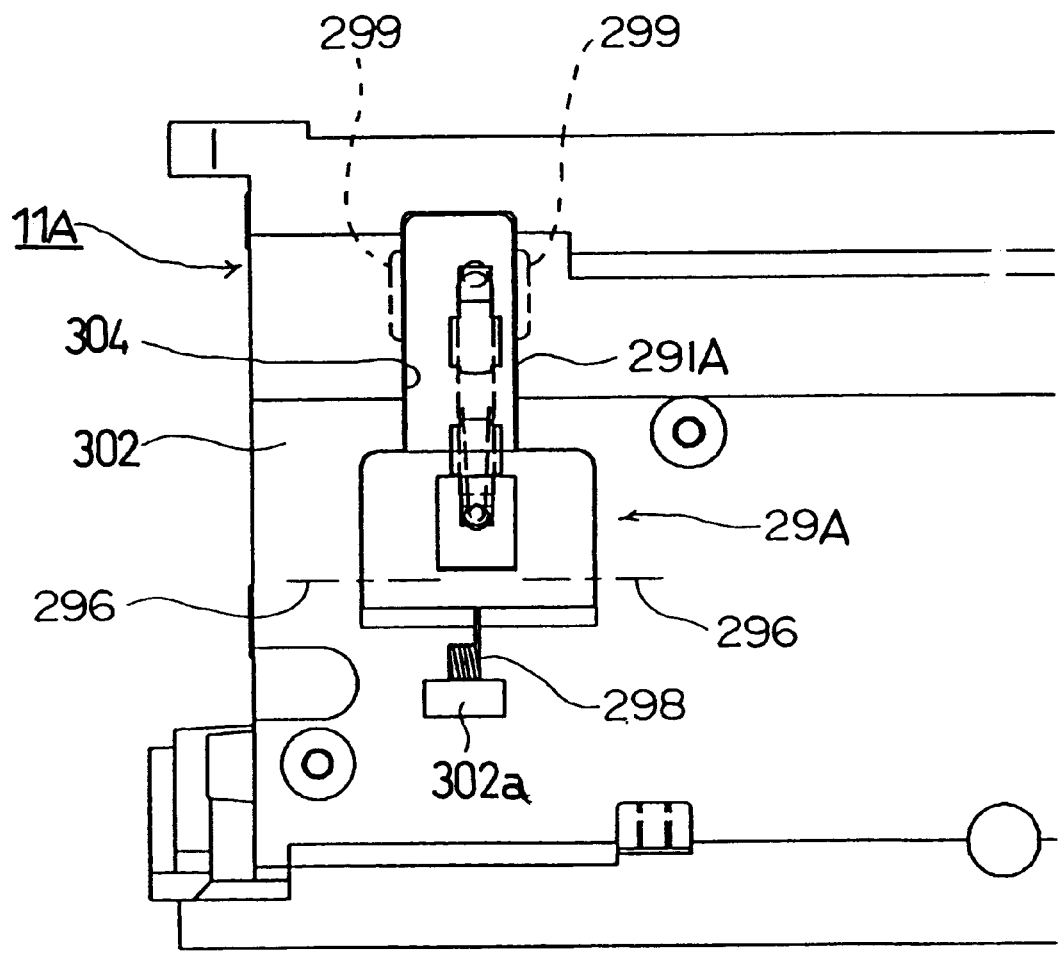
FIG. 6 is a plane view of a data imprinting unit and peripheral members of the camera shown in FIG. 5.

Stoppers 299 are formed integral with the housing 291A at respective sides (right and left sides as viewed in FIG. 6) of a front portion thereof as shown by dotted lines in FIG. 6. These stoppers 299 contact the upper wall 302 on respective sides of the elongated hole 304 when the front end (i.e., free end) of the housing 291A is positioned at the uppermost position thereof. Accordingly, the stoppers 299 determine the uppermost position of the front end of the housing 291A.

The film 278 is a Brownie film consisting of a film 278F and a paper 278P attached together (see FIG. 8). Due to such a structure, there is a slight difference between the inner and outer circumferences of the attached film 278F and the paper 278P. Therefore, there are tendencies that the film 278F is taut while the paper 278P is slack between the Brownie film roll 277 and the lower guide roller 275 and that the paper 278P is taut while the film 278F is slack between the upper guide roller 274 and the take-up spool 276, as shown in FIG. 8.

However, even in the case where the film 278F becomes slack between the upper guide roller 274 and the take-up spool 276, since the housing 291 is biased to rotate about the shaft 296 by the torsion spring 298 in the direction to bring the bottom front surface 295a of the housing 291 into pressing contact with the film 278F wound around the upper guide roller 274, the bottom front surface 295a of the housing 291 will be displaced so that it follows the slacking of the film 278F. Accordingly, the bottom front surface 295a of the housing 291 will continuously contact the film 278F, which makes it possible for the data printing unit 29A to imprint the photographic data on the film 278 clearly.

According to the second embodiment of the camera 11A, effects similar to those of the first embodiment of the camera 11 can be expected.

Furthermore, according to the second embodiment of the camera 11A, since the bottom front surface 295a of the housing 291 continuously contacts the film 278F, a portion of the film 278F on which the photographic data is to be imprinted can be maintained within the depth of focus of the image forming optical system 293, even when the film 278F becomes slack between the upper guide roller 274 and the take-up spool 276. As a result, thereby the photographic data is always clearly imprinted on the film 278.

In the second embodiment of the camera 11A, although the photographic data is imprinted by the data imprinting unit 29A on the marginal portion 278A of the film 278 that is out of the image plane of each frame, the photographic data may be imprinted by the data imprinting unit 29A within the image plane of each frame, e.g., along a margin of the image plane of each frame.

In the second embodiment the housing 291 is rotatably supported by the upper wall 302 about the shaft 296, as noted above. However, the housing 291 may be guided in the vertical direction of the camera 11A to move towards and away from the upper guide roller 274 while the housing 291 is biased towards the upper guide roller 274. Employing such modifications, effects similar to those of the first embodiment can be expected.

Further, a light intercepting member such as a light intercepting film, cloth or paper may be provided over the gap between the elongated hole 304 and the housing 291A to prevent light from passing through the gap, if necessary.

FIGS. 9 through 14 show a third embodiment of a medium format SLR camera using Brownie film that is provided at its back with an interchangeable film holder 27. Since the third embodiment of the camera 11B is similar to the first embodiment of the camera 11, only those structures different from the first embodiment will be hereinafter discussed.

The main difference between the first and third embodiments is that in the first embodiment the data imprinting unit 29 is fixed to the upper wall 302 whereas in the third embodiment a data imprinting unit 29B, which is similar to the data imprinting unit 29 of the first embodiment, is supported by the upper wall 302 to be shiftable in a widthwise direction of the film 278.

The data imprinting unit 29B consists of a housing 291B, a character generator 292 and an image forming optical system 293. The camera body 13 is provided below the eyepiece optical system 253 with an upper wall 302 which is formed integral with the camera body 13 to define the upper limit of the film holder receiving chamber 17. The upper wall 302 is provided at a front portion thereof with a guiding hole 1704 formed at a position opposed to a periphery of the upper guide roller 274 in the vicinity of one end (left end as viewed in FIG. 12) thereof. The guiding hole 1704 is formed to have a length corresponding to the length of the housing 291B in the front and rear direction of the film holder receiving chamber 17 and a width larger than the width of the housing 291B in the right and left direction of the film holder receiving chamber 17 (i.e., the right and left direction of the camera 11B) to allow the housing 291B to shift along the guiding hole 1704 in the right and left direction of the film holder receiving chamber 17 (i.e., the widthwise direction of the film 278) by a predetermined amount, so as to change the imprinting position of the photographic data on the film 278, e.g., between the inside of the exposed frame and the outside of the exposed frame.

Figure 11:
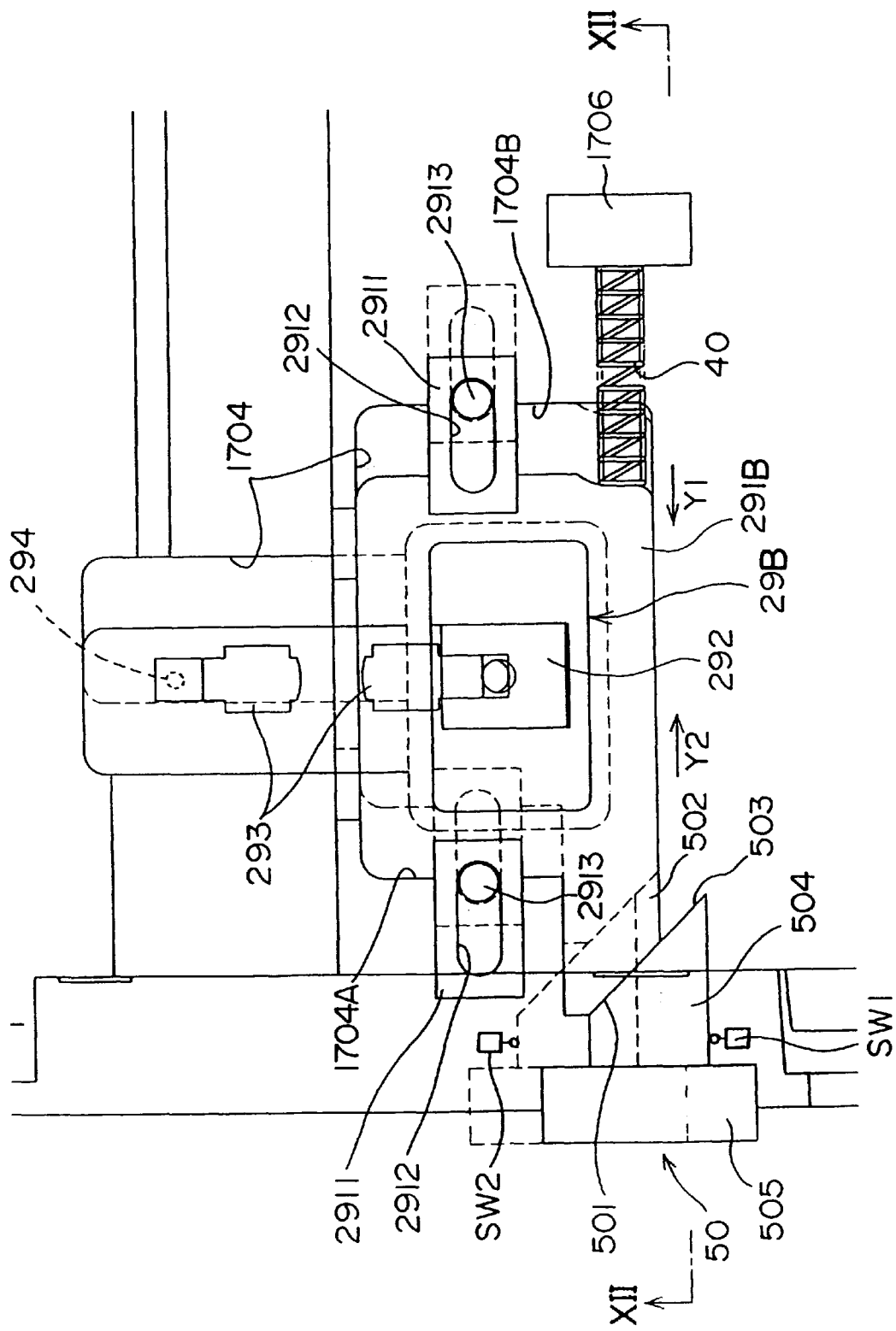
FIG. 11 is a plane view of the data imprinting unit and peripheral members of the camera shown in FIG. 9.

In order to shiftably support the data imprinting unit 29B, as shown in FIG. 11 two supporting parts 2911 are respectively protruded from left and right ends of a rear portion of the housing 291B so that each overlaps the upper face of the upper wall 302, and a slot 2912 which extends in the right and left direction of the film holder receiving chamber 17, is formed on each supporting part 2911. The data imprinting unit 29B is supported on the upper wall 302 to be fitted in the guiding groove 1704 to be shiftable in the right and left direction of the film holder receiving chamber 17 (in the widthwise direction of the film 278) with each of two guide pins 2913 protruded upwards from the upper face of the upper wall 1702 with a corresponding one of the slots 2912.

When the housing 291B is positioned at a first position to contact the left end 1704A of the guiding hole 1704, the data imprinting unit 29B can imprint the photographic data on a marginal portion 278A (see FIG. 14) of the film 278 which is wound around the upper guide roller 278, i.e. on a surface of the film 278 outside the exposed frame thereof. Conversely, when the housing 291B is positioned at a second position to contact the right end 1704B of the guiding hole 1704, the data imprinting unit 29B can imprint the photographic data on a surface of the film 278 inside the exposed frame thereof.

A coil spring 40 serving as a biasing means is provided between the rear portion of the housing 291B and a stationary portion 1706 protruded upwards from the upper face of the upper wall 302 which faces the rear portion of the housing 291B. The coil spring 40 constantly urges the data imprinting unit 29B towards the aforementioned first position, i.e., towards the left end 1704A of the guiding hole 1704.

A data imprinting unit moving device 50 for manually moving the data imprinting unit 29B between the first and second positions is provided at the rear of the housing 291B at a position opposite to the coil spring 40 with respect to the housing 291B.

Figure 12:
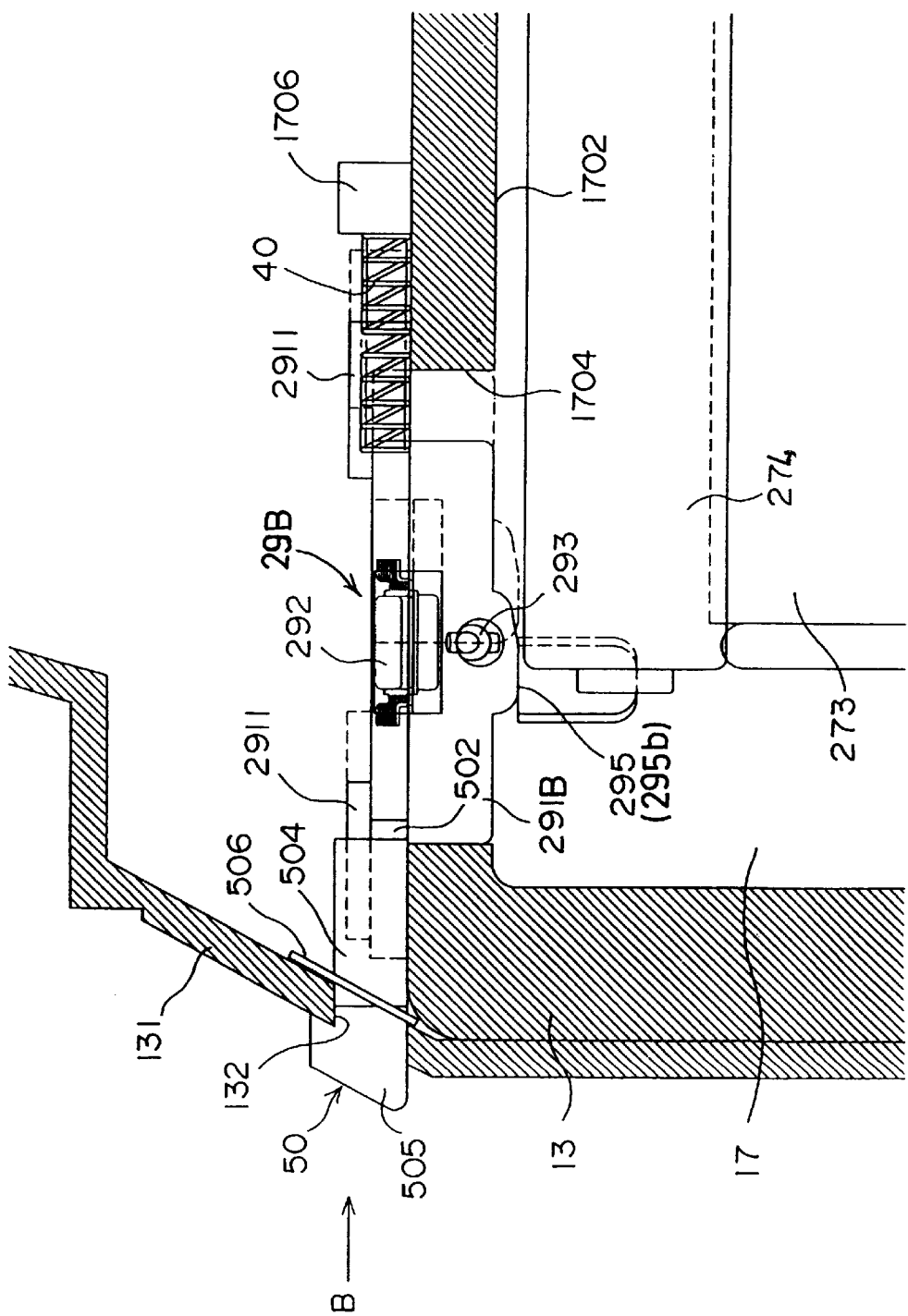
FIG. 12 is a cross-sectional view taken along the XII—XII line shown in FIG. 11.
Figure 13:
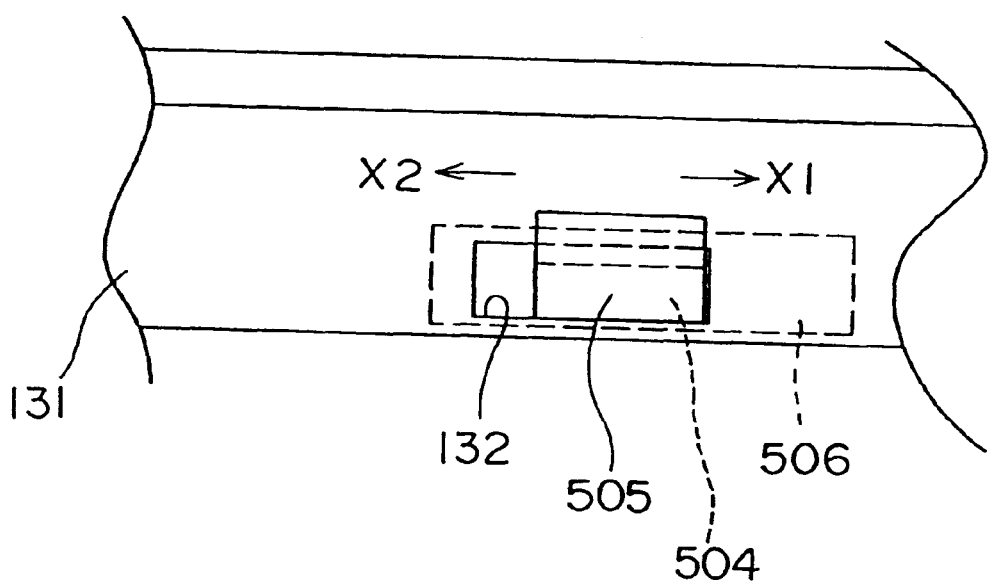
FIG. 13 is a view of a part of the camera shown in FIG. 9 as viewed in a direction of an arrow B shown in FIG. 12.
Figure 14:
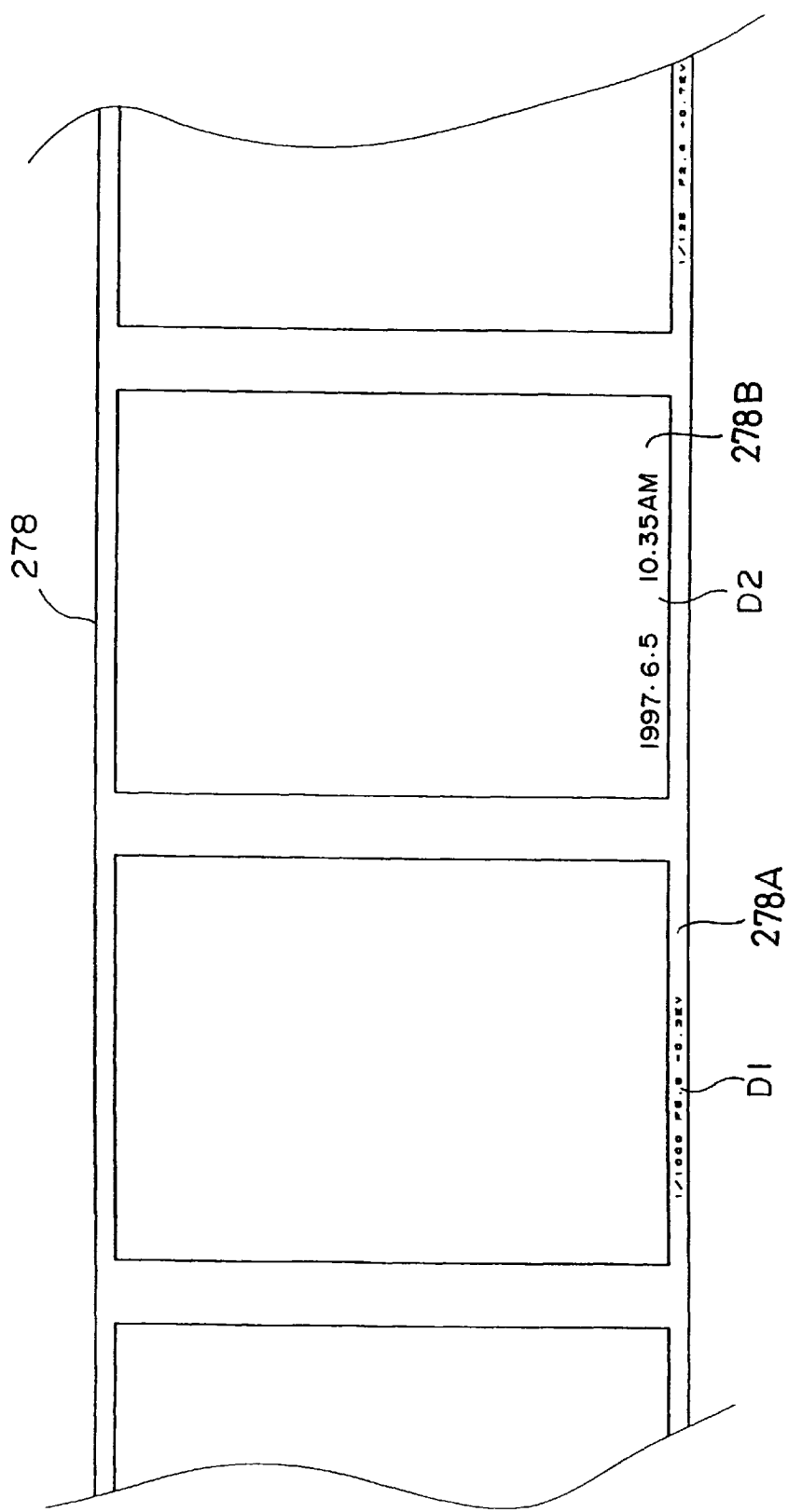
FIG. 14 is a plane view of a part of Brownie film, used in the camera shown in FIG. 9, on which photographic data has been imprinted.
Figure 15:
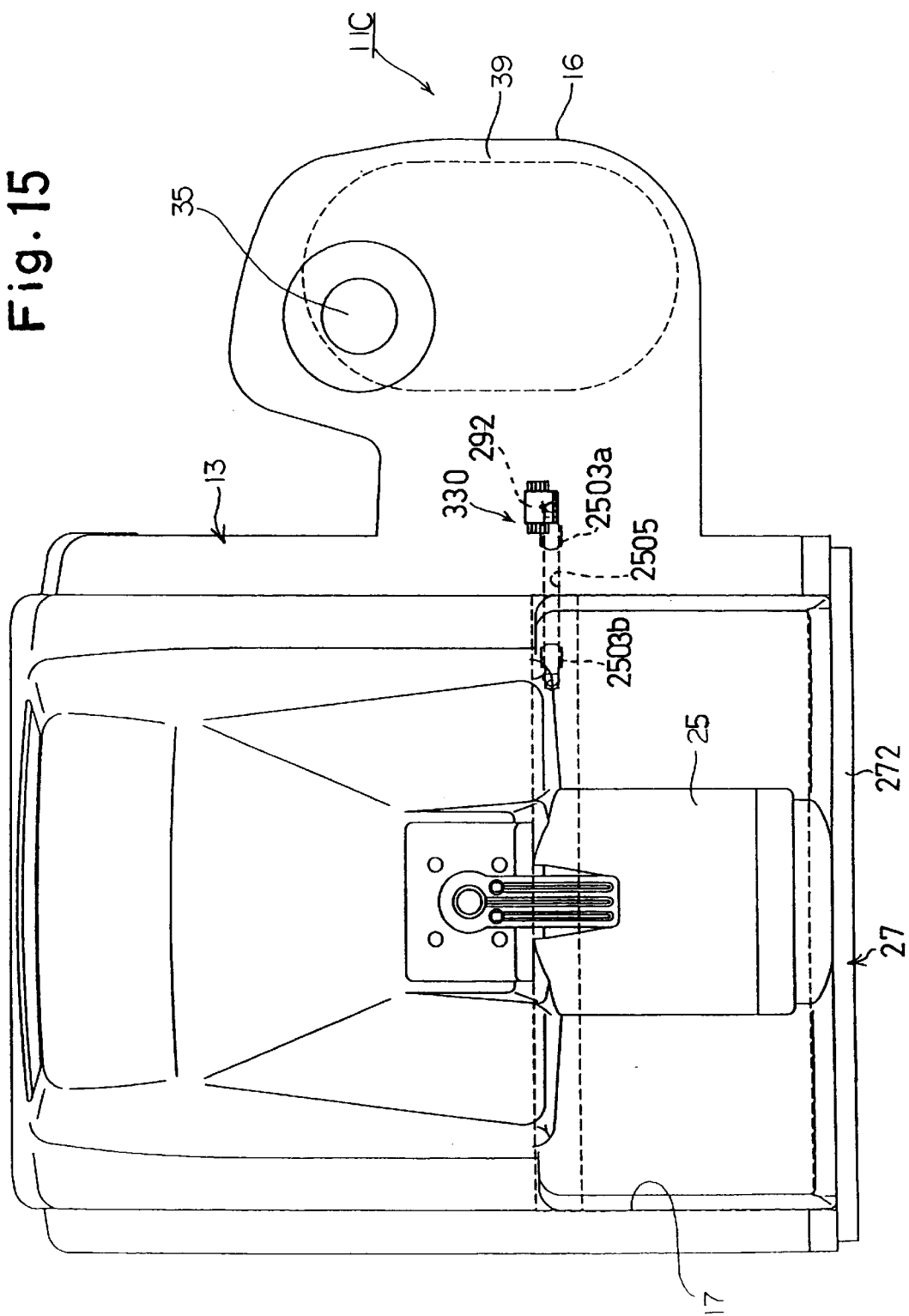
FIG. 15 is a plane view of a fourth embodiment of a camera using Brownie film that is provided with an interchangeable film holder.

As shown in FIGS. 11 through 13, the data imprinting unit moving device 50 consists of a protrusion 502 formed integral with the housing 291B, an operating member 504 which contacts the protrusion 502, and a knob 505 formed integral with the operating member 504. The protrusion 502 protrudes from the rear end of the housing 291B in a direction apart from the stationary portion 1706 (leftwards as viewed in FIG. 11) along the right and left direction and is provided at the left end thereof with a beveled surface 501. One end of the operating member 504 is slidably fitted in a guide hole 132 formed on a cover 131 (see FIG. 12) for covering the camera body 13 while the other end of the operating member 504 is provided with a beveled surface 503 which slidably contacts the beveled surface 501. The guide hole 132 is formed longer than the operating member 504 in the front and rear direction of the film holder receiving chamber 17 (in the vertical direction as viewed in FIG. 11) to allow the operating member 504 to move in the same direction along the guide hole 132. The operating member 504 is prevented from moving in the right and left direction of the film holder receiving chamber 17 (i.e., in the horizontal direction as viewed in FIG. 11). The gap between the guide hole 132 and the operating member 504 is covered by a light intercepting member 506 (see FIG. 12) positioned to slidably contact a rear surface of the cover 131 around the guide hole 132 so as to prevent ambient light from entering the interior of the camera body 13 through the guide hole 132. A bottom surface of the housing 291B is formed as a film guide surface 295 similar to that of the housing 291 of the first embodiment. A bottom front surface 295b of the film guide surface 295 faces one end (left end as viewed in FIG. 12) of the upper guide roller 274 and is provided with the aforementioned slit 294.

While the film 278 is being wound up after the exposure of a film frame of the film 278, photographic data for the film frame is successively output from a CPU (not shown) for controlling the data imprinting unit 29. This data is provided as input to the character generator 292 in synchronization with the film feeding speed, and the character generator 292 emits light in accordance with the input photographic data, so that the image of a certain character pattern is exposed selectably on either the unexposed marginal portion 278A of the exposed film frame or a portion 278B located inside the exposed film frame adjacent to the marginal portion 278A. In this exposing or imprinting operation, in the case where the photographic data is to be imprinted on the marginal portion 278A, the knob 505 needs to be manually moved rearwardly (in the direction of an arrow X1 shown in FIG. 13) to a rear end position thereof in advance to move the operating member 504 in the same direction until it contacts a rear end of the guide hole 132. The operating member 504 positioned at a rearmost position to contact the rear end of the guide hole 132 is shown by solid lines in FIG. 11. When the operating member 504 is moved to the rearmost position, due to the relationship of engagement of the beveled surface 501 with the beveled surface 503, the data imprinting unit 29B, which includes the housing 291B, will move in the direction of an arrow Y1 (see FIG. 11) due to the biasing force of the coil spring 40 to be retained at a first position where the housing 291B is in contact with a left end 1704A of the guiding hole 1704, as shown by solid lines in FIG. 11. Consequently, the slit 294 of the data imprinting unit 29B will be positioned facing the unexposed marginal portion 278A of the exposed film frame, so that the photographic data, e.g., photographic data D1 shown in FIG. 14 which includes a shutter speed, an aperture value and an exposure compensation value, will be imprinted on the marginal portion 278A of the exposed film frame.

Conversely, in the exposing or imprinting operation, in the case where the photographic data is to be imprinted on the portion 278B inside the exposed film frame, the knob 505 needs to be manually moved forwardly (in the direction of an arrow X2 shown in FIG. 13) to a front end position thereof in advance to move the operating member 504 in the same direction until it contacts a front end of the guide hole 132. The operating member 504 positioned at a frontmost position to contact the front end of the guide hole 132 is shown by dotted lines in FIG. 11. When the operating member 504 is moved to the frontmost position, due to the relationship of engagement of the beveled surface 501 with the beveled surface 503, the data imprinting unit 29B, which includes the housing 291B, will move in the direction of an arrow Y2 (see FIG. 11) against the biasing force of the coil spring 40 to be retained at a second position where the housing 291B is in contact with a right end 1704B of the guiding hole 1704, as shown by dotted lines in FIG. 11. The data imprinting unit 29B may be retained at the second position against the biasing force of the coil spring 40 by a conventional mechanism including, e.g., a projection formed on the operating member 504 and a groove formed on the camera body 13 with which the projection can click in when the data imprinting unit 29B moves from the first position to the second position. Consequently, the slit 294 of the data imprinting unit 29B will be positioned facing the portion 278B of the exposed film frame, so that the photographic data, e.g., photographic data D2 shown in FIG. 14 which includes year/month/date and time, will be imprinted on the portion 278B of the exposed film frame.

As shown in FIG. 11, on opposite sides with respect to the operating member 504 are provided switches SW1 and SW2 which are turned ON when the operating member 504 is positioned at the rearmost position shown by the solid lines in FIG. 11 and at the frontmost position shown by the dotted lines in FIG. 11, respectively. Under the condition that the switch SW1 is ON, the CPU for controlling the data imprinting unit 29 automatically outputs the photographic data D1, which includes a shutter speed, an aperture value and an exposure compensation value, to the character generating means 292 upon receiving an ON signal of the switch SW1. Conversely, under the condition that the switch SW2 is ON, the CPU automatically outputs the photographic data D2, which includes year/month/date and time, to the character generating means 292 upon receiving an ON signal of the switch SW2.

According to the third embodiment, effects similar to the first embodiment can be expected. Furthermore, since the data imprinting unit 29B is mounted to the upper wall 302 of the film holder receiving chamber 17 to be shiftable in the right and left direction of the film holder receiving chamber 17, i.e., the widthwise direction of the film 278, it is possible for the photographic data to be selectably imprinted on either the inside or the outside area of the film frame where subject images are to be exposed, according to the desire of the user. Moreover, since the light projected from the character generator 292 to be incident on the film 278 is not divided by a prism or the like, the quantity of the light will not become small, which makes it possible to imprint the photographic data sharply and clearly on the film 278.

Although in the third embodiment the photographic data is imprinted on either the inside or the outside area of the film frame where subject images are to be exposed in the medium format camera 11B using Brownie film, the present invention is not limited thereto but can be applied in a similar manner to a data imprinting device provided in a camera which can take either regular sized or panorama sized pictures.

Furthermore, although in the third embodiment the data imprinting device is applied to a medium format camera using a Brownie film, the present invention is not limited thereto but can also be applied to a 35 mm single-lens reflex camera.

Furthermore, in the third embodiment the film to be used for the data imprinting device is not limited to Brownie film but may be a film with perforations, etc.

Furthermore, although in the third embodiment the location of imprinting the photographic data on the film by the data imprinting unit is selectable between two positions as described above, the present invention is not limited thereto but arrangements can also be made so that the data imprinting unit may be movable by the data imprinting unit moving device to a position selected from a plurality of positions or may be movable continuously in the widthwise direction of the film.

FIGS. 15 through 19 show a fourth embodiment of a medium format SLR camera using Brownie film that is provided at its back with an interchangeable film holder 270. Since the fourth embodiment of the camera 11C is similar to the first embodiment of the camera 11, only those structures different from the first embodiment will be hereinafter discussed.

Figure 16:
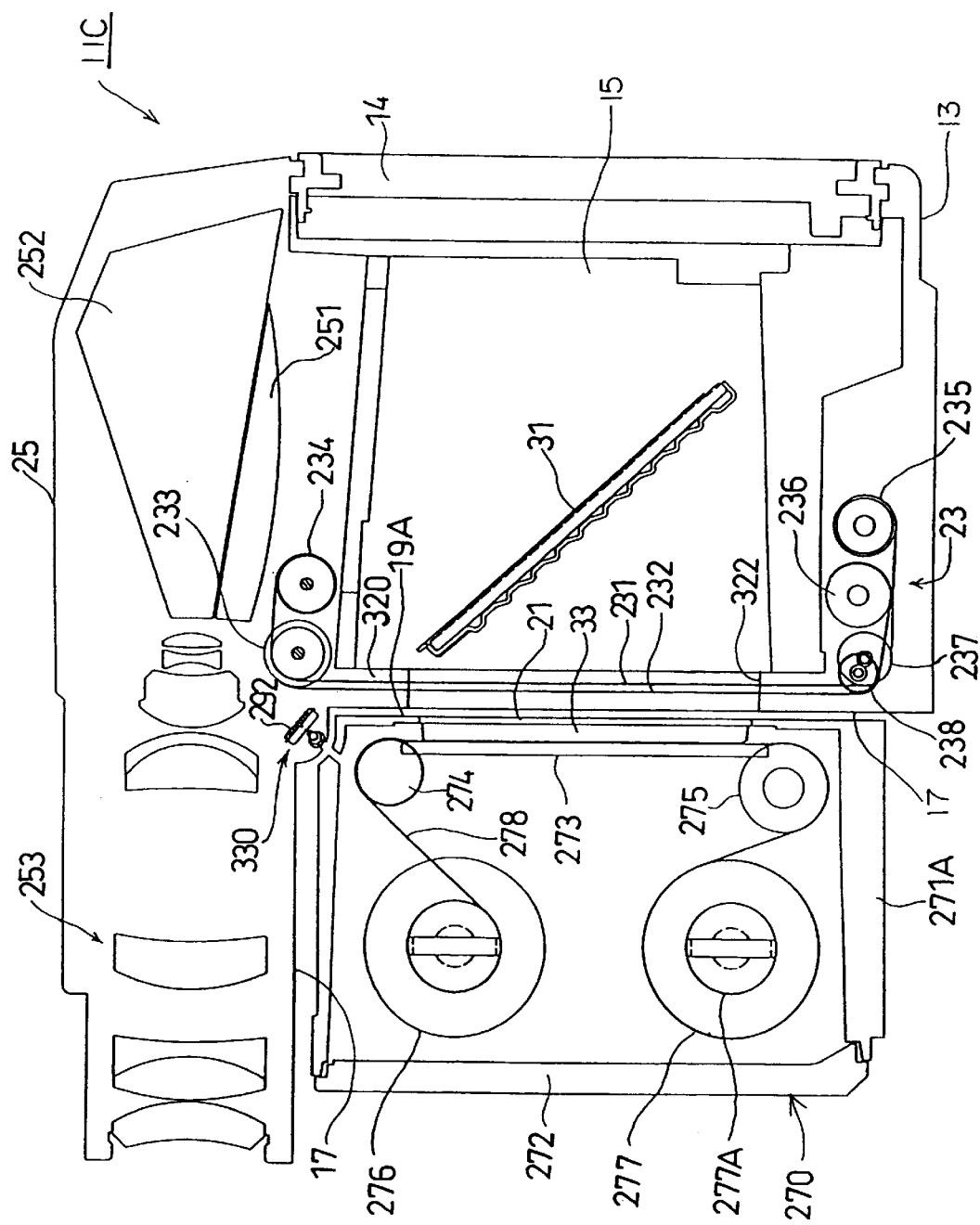
FIG. 16 is a cross-sectional view of the camera shown in FIG. 15.

The camera 11C is provided at its back with the interchangeable film holder 270. This film holder 270 is detachably attached to the camera body 13 by inserting the major part of the film holder 270 into the film holder receiving chamber 17 in a manner similar to the film holder 27 of the first embodiment. The film holder 270 is provided with a film holder body 271A which is inserted in the film holder receiving chamber 17 when the film holder 270 is attached to the camera body 13. In the first embodiment the aperture frame 19 is formed on the camera body 13, whereas in the fourth embodiment an aperture frame 19A, which corresponds to the aperture frame 19 of the first embodiment, is formed on the film holder 270 at the front of the film holder body 271A. The camera body 13 is provided between the mirror box 15 and the film holder receiving chamber 17 with a back wall 320 which defines the rearmost limit of the inner space of the mirror box 15. The back wall 320 is provided with an opening 322 which is larger than the aperture 21. Through the opening 322 and the aperture 21 subject light which has passed through the photographic optical system and the mirror box 15 enters the film frame positioned on the pressure plate 273 at the time of exposure. In the first embodiment, the trailing curtain drum 234 is positioned behind the leading curtain drum 233, as shown in FIG. 1, whereas in the fourth embodiment the trailing curtain drum 234 is positioned in front of the leading curtain drum 233, as shown in FIG. 16.

Figure 17:
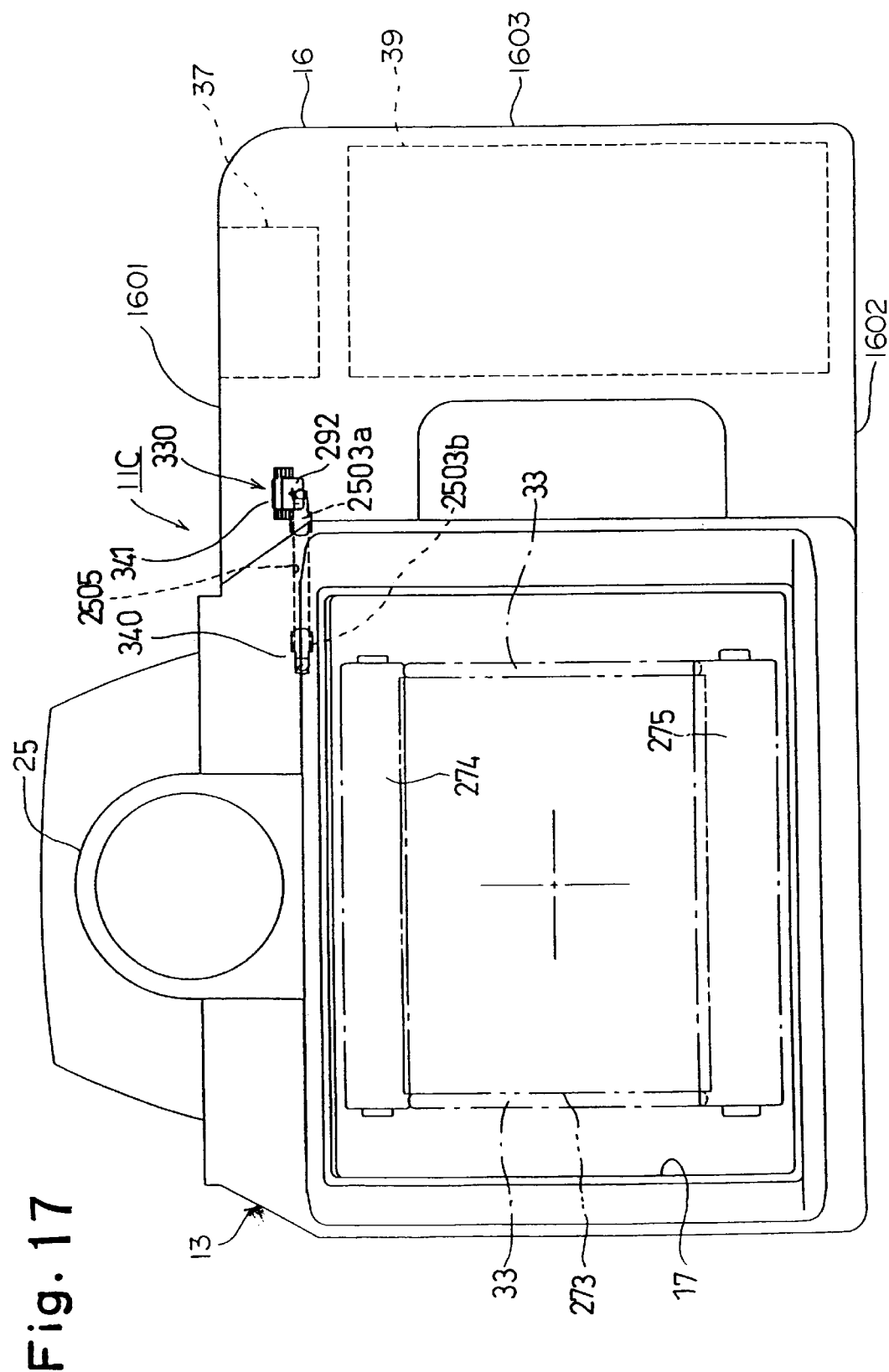
FIG. 17 is a rear view of the camera shown in FIG. without the interchangeable film holder being attached to the rear of the camera body.
Figure 18:
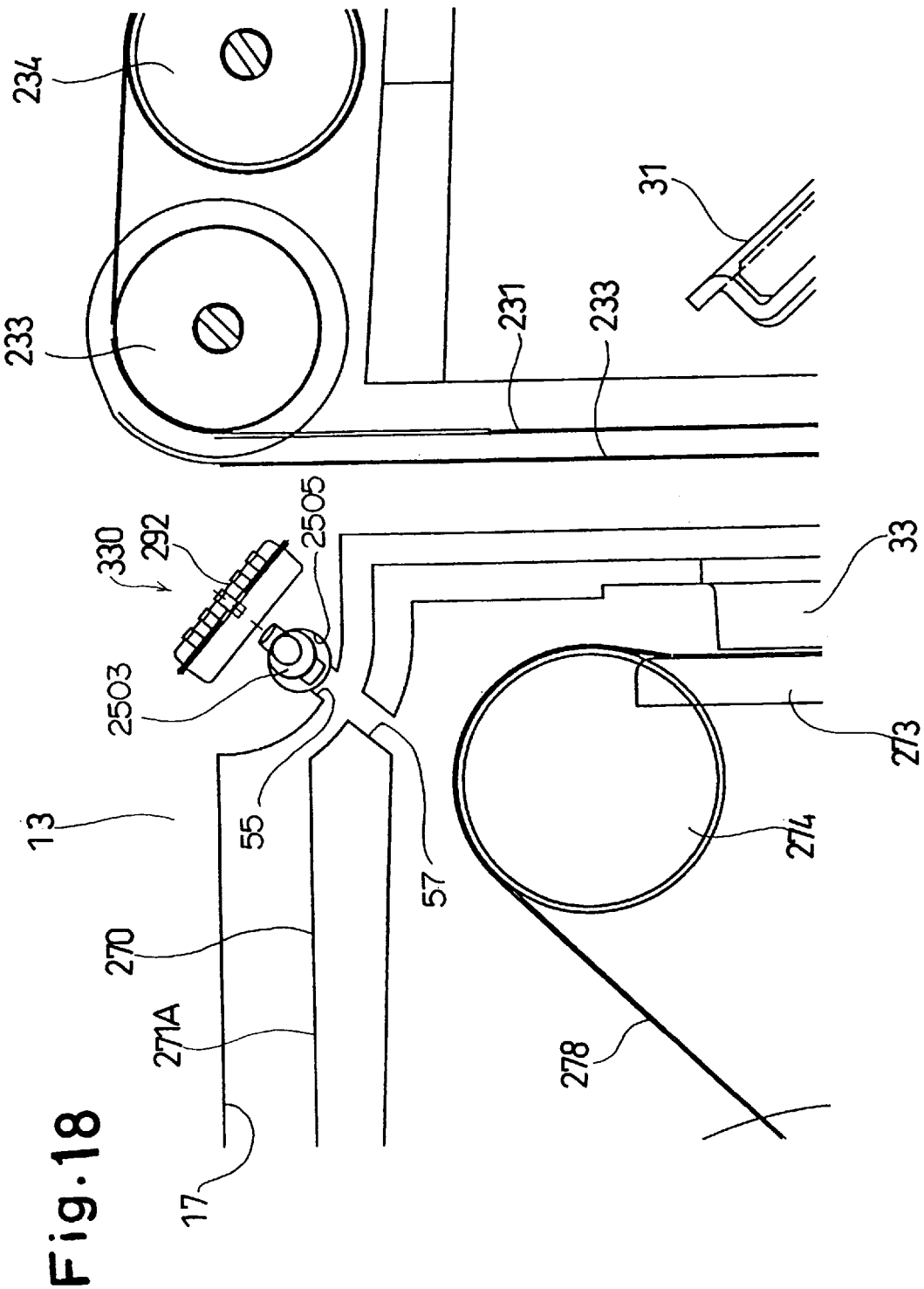
FIG. 18 is a cross-sectional view of a data imprinting unit and peripheral members of the camera shown in FIG. 15.
Figure 19:
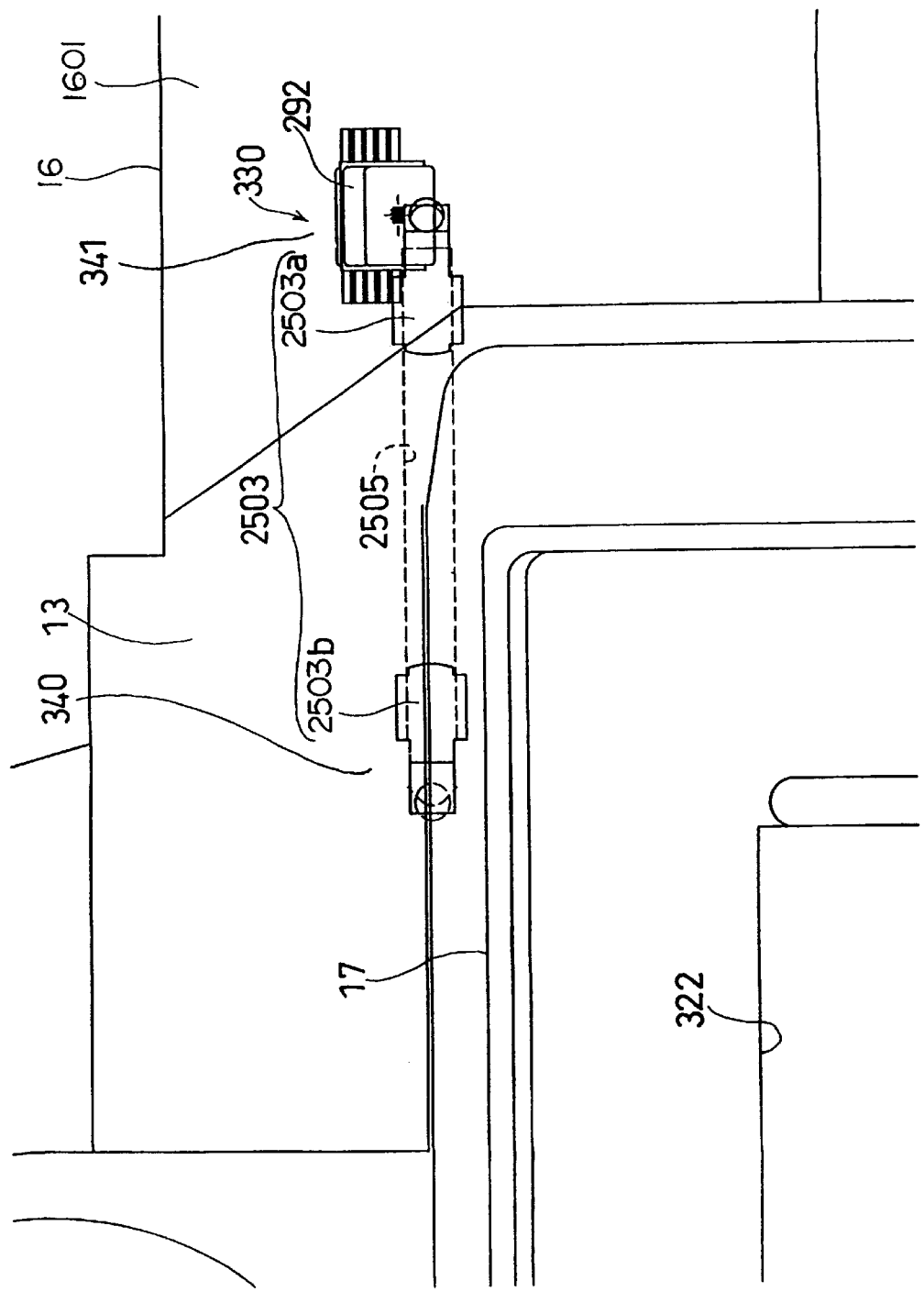
FIG. 19 is an enlarged view of the rear view of the camera shown in FIG. 17.

As shown in FIG. 17, a grip 16 is integrally formed on one side of the camera body 13, i.e., on the right side of the camera body 13 as viewed from the rear of the camera 11C. The grip 16 is provided on an upper front surface thereof with a release button 35. The grip 16 consists of an upper connecting part 1601, which extends horizontally from an upper part of the camera body 13 to the right as viewed in FIG. 17, a lower connecting part 1602, which extends horizontally from a bottom part of the camera body 13 to the right as viewed in FIG. 17, and a grip part 1603, which extends vertically to connect the upper connecting part 1601 with the lower connecting part 1602. A release switch mechanism 37 actuated by an operation of the release button 35 and a battery chamber 39 are disposed inside the grip part 1603.

The camera 11C is provided therein with a data imprinting device 330 which is arranged to lie substantially in the right and left direction of the camera 11C from an upper portion of the grip 16 to an upper portion of the camera body 13 above the upper guide roller 274. Specifically, the data imprinting device 330 is arranged on the right side of the viewfinder 25, as viewed from the rear of the camera 11C, to lie substantially in the right and left direction of the camera 11C from an upper left portion 341 of the grip 16 to an upper right portion 340 of the camera body 13 above the upper guide roller 274, as shown in FIG. 17.

The data imprinting device 330 includes a character generator 292 and an image forming optical system 2503. The character generator 292 is fixedly positioned in the camera body 13 above the upper guide roller 274 inside the upper connecting part 1601 of the grip 16, i.e., in the upper left portion 341 of the grip 16. In the camera body 13 an elongated hole 2505 having a circular cross-section is formed. The elongated hole 2505 extends horizontally in the right and left direction of the camera 11C from the character generator 292 to a through hole 55 connected to the film holder receiving chamber 17. The through hole 55 is made to face a periphery of the upper guide roller 274 in the vicinity of the right end thereof, as viewed in FIG. 18, with the film holder 270 being attached to the camera body 13. The image forming optical system 2503 consists of two separate optical elements 2503a and 2503b which are positioned in the right and left ends of the elongated hole 2505 (as viewed in FIG. 19), respectively. Each of the optical elements 2503a and 2503b may include an image forming lens, a reflecting mirror, etc. so that the light emitted by the character generator 292 passes through the through hole 55 and through the optical elements 2503a and 2503b to form the image of a character pattern on the marginal portion 278A of the film 278 wound around the upper guide roller 274. The optical element 2503b is positioned in the aforementioned upper right portion 340 of the camera body 13.

A through hole 57 is formed on the film holder body 271A at the position facing the through hole 55 with the film holder 270 being attached to the camera body 13 so that the light coming out of the through hole 55 is incident on the marginal portion 278A of the film 278 wound around the upper guide roller 274. Namely, the through holes 55 and 57 are aligned in a common line when the film holder 270 is properly attached to the camera body 13.

Various measures can be taken as suitable to prevent ambient light from entering the interior of the film back body 2301 through the through hole 57. For example, an appropriate light intercepting wall may be formed on the upper wall of the film back body 271A, or a suitable cover or a covering mechanism for opening and closing the through hole 57 when the film holder 270 is attached to and detached from the camera body 13, respectively.

According to the fourth embodiment of the camera 11C, due to the aforementioned arrangement of the camera 11C in which the data imprinting device 330 is arranged to lie substantially in the right and left direction of the camera 11C from an upper portion of the grip 16 to an upper portion of the camera body 13 above the upper guide roller 274, and in which the image forming optical system 2503 is arranged such that the light emitted by the character generator 292 is incident on the film 278 at a portion thereof which is wound around the upper guide roller 274 to form the image of a character pattern on that portion, the photographic data D such as the date, time, shutter speed, aperture value, etc. can be clearly imprinted on the film 278 in the focal plane shutter type of medium format camera 11C, that uses the interchangeable film holder 270.

Furthermore, according to the fourth embodiment, at least a part of the data imprinting device 330 is positioned in a dead space of the grip 16, which is effective in making the camera body 13 small and compact.

Furthermore, since the data imprinting device 330 is arranged to lie substantially in the right and left direction of the camera 11C from an upper portion of the grip 16 to an upper portion of the camera body 13 above the upper guide roller 274, the data imprinting device 330 can be provided without making a large room for accommodating the data imprinting device 330 between the viewfinder 25 and the film holder 270. Therefore, the data imprinting device 330 can be provided without enlarging the height of the camera 11C.

In the fourth embodiment of the camera 11C, although the photographic data is imprinted by the data imprinting device 330 on the marginal portion 278A of the film 278 that is out of the image plane of each frame, the photographic data may be imprinted by the data imprinting device 330 within the image plane of each frame, e.g., along a margin of the image plane of each frame.

Obvious changes may be made in the specific embodiments of the present invention described herein, including such modifications that are within the spirit and scope of the invention claimed. Further, it is noted that all matter contained herein is illustrative and does not limit the scope of the present invention.

What is claimed is:

1. A camera comprising:
   a camera body;
   a mirror box formed inside said camera body;
   a film holder receiving portion formed at the rear of said camera body behind said mirror box;
   an aperture member having a photographic aperture that forms the limits of each frame exposed, said aperture member being positioned between said mirror box and said film holder receiving portion;
   a film holder that accommodates a film roll, said film holder being detachably attached to said film holder receiving portion;
   a pair of film guide rollers provided in said film holder and extending parallel to each other to be respectively positioned along and adjacent to opposite ends of said photographic aperture, said film holder being attached to said film holder receiving portion so that a film drawn out of said film roll is wound around said pair of film guide rollers; and
   a data imprinting device, supported by said camera body, that imprints photographic data on a portion of said film which is contacting one of said pair of film guide rollers.

2. The camera according to claim 1, wherein said data imprinting device is formed as a unit to be supported by said camera body at a position adjacent to said film holder receiving portion.

3. The camera according to claim 1, wherein said film holder comprises a take-up spool positioned in said film holder so as to be parallel to a spool of said film roll, wherein said one of said pair of film guide rollers, around which said imprinting portion of said film is wound, is positioned in front of said take-up spool.

4. The camera according to claim 1, wherein said aperture member comprises film guide rails extending perpendicular to said pair of film guide rollers on respective sides of said photographic aperture to guide said film from one of said pair of film guide rollers to the other of said pair of film guide rollers, said data imprinting device comprising a slit through which light carrying an image of a character pattern is projected to said film, said slit being positioned to face an outer periphery of one of said pair of film guide roller in the vicinity of an end of one of said film guide rails.

5. The camera according to claim 1, wherein said data imprinting device is formed as a unit and comprises:
   a housing supported by said camera body to face said imprinting portion of said film, with said film holder being attached to said film holder receiving portion;
   a character generator, supported by said housing, that emits light carrying an image of a character pattern in accordance with character information; and
   an image forming optical system, positioned in said housing, that forms said image of said character pattern on said imprinting portion of said film.

6. The camera according to claim 5, wherein said housing is fixed to said camera body.

7. The camera according to claim 5, wherein said housing comprises a film guide surface that guides said film between said film guide surface and an adjacent one of said pair of film guide rollers, with said film holder being attached to said film holder receiving portion to prevent said film wound around said adjacent one of said pair of film guide rollers from becoming loose.

8. The camera according to claim 7, wherein said film guide surface is formed as a smooth surface.

9. The camera according to claim 8, wherein said housing comprises a slit through which light emitted by said character generator is projected to said film, said slit being positioned to face said imprinting portion of said film with said film holder being attached to said film holder receiving portion.

10. The camera according to claim 1, further comprising a focal plane shutter for opening and closing said photographic aperture.

11. The camera according to claim 1, wherein said imprinting portion of said film is a marginal portion of said film which extends in a lengthwise direction of said film along an edge thereof.

12. The camera according to claim 1, wherein said pair of film guide rollers are positioned to extend in a widthwise direction of said film.

13. The camera according to claim 1, wherein said data imprinting device comprises a light projecting portion that projects light towards said film, said light projecting portion being positioned to face one of two marginal portions of said film in a widthwise direction of said film.

14. The camera according to claim 1, said camera being a medium format camera, wherein said film is a Brownie film.

15. The camera according to claim 1, wherein said camera body is provided at a front thereof with a lens mount to which an interchangeable photographic lens is detachably attached.

16. The camera according to claim 1, further comprising:
a grip formed on one side of said camera body; and
a take-up spool, positioned in said film holder, for taking up said film draw out of said film roll, said take-up spool extending parallel to a spool of said film roll, said one of said pair of film guide rollers being positioned in front of said take-up spool,
wherein said data imprinting device is arranged to extend from said grip to said camera body.

17. The camera according to claim 16, wherein said data imprinting device comprises:
a character generator that emits light carrying an image of a character pattern in accordance with character information; and
an image forming optical system that forms said image of said character pattern on said imprinting portion of said film,
wherein said character generator and a part of said image forming optical system are positioned in said grip while the remaining part of said image forming optical system is positioned in said camera body.

18. The camera according to claim 17, wherein an optical axis of said image forming optical system extends in a right and left direction of said camera.

19. The camera according to claim 18, wherein said one of said pair of film guide rollers and the other of said pair of film guide rollers extend horizontally along upper and lower ends of said photographic aperture, respectively.

20. The camera according to claim 19, further comprising two through holes formed on said camera body and said film holder, respectively, said two through holes being aligned with said film holder being attached to said film holder receiving portion so that light emitted by said character generator is projected to said imprinting portion of said film through said two through holes.

21. The camera according to claim 16, further comprising a finder optical system positioned in said camera body above said mirror box, wherein said data imprinting device is arranged on one side of said finder optical system to lie in a right and left direction of said camera.

22. A camera comprising:
a camera body;
a film holder that accommodates a film roll, said film holder being detachably attached to said camera body;
a take-up spool positioned in said film holder;
a film guide roller, positioned in said film holder in front of said take-up spool, that guides a film drawn out of said film roll to said take-up spool; and
a data imprinting device that imprints photographic data on an imprinting portion of said film which is contacting the film guide roller.

23. The camera according to claim 22 being a medium format camera, wherein said film is a Brownie film.

24. The camera according to claim 22, wherein said data imprinting device is formed as a unit which is movably supported by said camera body in a direction towards and away from said imprinting portion of said film.

25. The camera according to claim 24, wherein said data imprinting device is biased in a direction to contact said imprinting portion of said film.

26. The camera according to claim 16, said data imprinting device comprising a housing that is movably supported by said camera body in a direction towards and away from said imprinting portion of said film.

27. The camera according to claim 26, wherein said housing is biased in a direction to contact said imprinting portion of said film.

28. The camera according to claim 26, wherein said housing comprises a film guide surface for guiding said film between said film guide surface and said film guide roller, when said film holder s attached to said film holder portion, to prevent said film wound around said film guide roller from becoming loose.

29. The camera according to claim 28, wherein said data imprinting device comprises a character generator supported by said housing, said housing comprising a slit through which light emitted by said character generator is projected to said film, said slit being positioned to face said imprinting portion of said film with said film holder being attached to said film holder receiving portion.

30. The camera according to claim 24, wherein said film guide roller extends horizontally along an end of a photographic aperture, and wherein said housing substantially extends in a front and rear direction of said camera such that a bottom front of said housing faces a portion of said film and that a rear portion of said housing is rotatably supported by said camera body.

31. The camera according to claim 30, wherein said rear portion of said housing is rotatably supported about an axis extending parallel to said film guide roller.

32. The camera according to claim 30, wherein a bottom surface of said housing is formed as a smooth surface.

33. The camera according to claim 30, wherein said housing comprises a slit formed at said bottom front of said housing through which a light carrying an image of character pattern is projected to said film.

34. The camera according to claim 33, wherein said bottom front of said housing contacts said imprinting portion of said film which is wound around said film guide roller.

35. A camera comprising:
a camera body;
a film holder that accommodates a film roll, said film holder being detachably attached to said camera body;
a take-up spool positioned in said film holder;

a film guide roller, positioned in said film holder in front of said take-up spool, that guides a film drawn out of said film roll to said take-up spool;

a data imprinting device that imprints photographic data on an imprinting portion of said film which is contacting the film guide roller with said film holder being attached to said camera body, said data imprinting unit being movable in a direction towards and away from said imprinting portion of said film; and a biasing member that biases said data imprinting device towards said imprinting portion of said film.

36. The camera according to claim 35, said camera being a medium format camera, wherein said film is a Brownie film.

37. The camera according to claim 29, wherein said data imprinting device is formed as a unit which is movably supported by said camera body in a widthwise direction of said film, and wherein said camera further comprises a moving device that moves said data imprinting device in said widthwise direction of said film.

38. The camera according to claim 37, said data imprinting device comprising a housing that is movably supported by said camera body in a widthwise direction of said film.

39. The camera according to claim 38, wherein said housing comprises a film guide surface for guiding said film between said film guide surface and said film guide roller, when said film holder is attached to said film holder portion, to prevent said film wound around said film guide roller from becoming loose.

40. The camera according to claim 39, wherein said data imprinting device further comprises a character generator, said housing comprising a slit through which light emitted by said character generator is projected on said film, said slit being positioned to face said imprinting portion of said film with said film holder being attached to said film holder receiving portion.

41. The camera according to claim 37, wherein said data imprinting device is movable in said widthwise direction of said film between a first position where said data imprinting device can imprint said photographic data on a marginal portion of said film which is out of an image plane on said film and a second position where said data imprinting device can imprint said photographic data within said image plane on said film.

42. The camera according to claim 41, wherein said data imprinting device imprints photographic data including at least a shutter speed and an aperture value when positioned at said first position or imprints photographic data including at least time or date of photography when positioned at said second position.

43. The camera according to claim 37, wherein said moving device comprises a knob which can be manually operated, said data imprinting device being manually moved in said widthwise direction of said film by operating said knob.

44. A camera comprising:

a camera body;

a film holder that accommodates a film roll, said film holder being detachably attached to said camera body;

a take-up spool positioned in said film holder;

a film guide roller positioned in said film holder in front of said take-up spool that guides a film drawn out of said film roll to said take-up spool; and a data imprinting device that imprints photographic data on a portion of said film which is contacting the film guide roller with said film holder being attached to said camera body, said data imprinting device being movable in a widthwise direction of said film.

45. The camera according to claim 44, said camera being a medium format camera, wherein said film is a Brownie film.

46. A camera comprising:

a camera body;

a grip formed on said camera body; and a film holder that accommodates a film roll, said film holder being detachably attached to said camera body; and a data imprinting device that imprints photographic data on a portion of a film drawn out of said film roll with said film holder being attached to said camera body, said data imprinting device being positioned to extend from said grip to said camera body.

47. The camera according to claim 46, wherein said film holder comprises a pair of film guide rollers positioned on respective sides of an image plane to guide said film from one of said pair of film guide rollers to the other of said pair of film guide rollers, and wherein said data imprinting device imprints said photographic data on a portion of said film which is wound around said other of said pair of film guide rollers.

48. The camera according to claim 46, said camera being a medium format camera, wherein said film is a Brownie film.

49. A camera comprising:

a camera body;

a film holder receiving portion formed at the rear of said camera body;

a grip formed on one of right and left sides of said camera body;

a film holder that accommodates a film roll, said film holder being detachably attached to said film holder receiving portion;

a take-up spool positioned in said film holder to extend parallel to a spool of said film roll;

upper and lower guide rollers disposed in said film holder in front of said take-up spool and said spool, respectively, and extending parallel to each other to be positioned on upper and lower sides of an image plane, respectively, with said film holder being attached to said film holder receiving portion so that a film drawn out of said film roll is wound around said upper and lower guide rollers; and a data imprinting device that imprints photographic data on a portion of said film which is wound around said upper guide roller, said data imprinting device being arranged to lie in a right and left direction of said camera from said grip to said camera body.

50. The camera according to claim 49, wherein said data imprinting device comprises:

a character generator that emits light carrying an image of a character pattern in accordance with character information; and an image forming optical system that forms said image of said character pattern on said imprinting portion of said film, wherein said character generator and a part of said image forming optical system are positioned in said grip while the remaining part of said image forming optical system is positioned in said camera body.

51. The camera according to claim 50, wherein an optical axis of said image forming optical system extends in said right and left direction of said camera.

52. The camera according to claim 50, further comprising two through holes formed on said camera body and said film holder, respectively, said two through holes being aligned with said film holder being attached to said film holder receiving portion so that light emitted by said character generator is projected to said imprinting portion of said film through said two through holes.

53. The camera according to claim 49, further comprising a finder optical system positioned at a top of said camera body, wherein said data imprinting device is arranged on one side of said finder optical system to lie in said right and left direction of said camera from an upper portion of said grip to an upper portion of said camera body.

* * * * *

UNITED STATES PATENT AND TRADEMARK OFFICE
CERTIFICATE OF CORRECTION

PATENT NO. : 6,081,674
DATED : June 27, 2000
INVENTOR(S) : H. TATAMIYA

It is certified that error appears in the above-identified patent and that said Letters Patent is hereby corrected as shown below:

On the cover of the printed patent, at Item [22], Filing Date, change "Oct. 3, 1997" to ---Oct .6, 1997---

Signed and Sealed this

Eighth Day of May, 2001

*Attest:*

NICHOLAS P. GODICI

*Attesting Officer*      *Acting Director of the United States Patent and Trademark Office*